(No Model.) 21 Sheets—Sheet 1.
N. STROTZ.
CIGAR BUNCHING MACHINE.
No. 482,882. Patented Sept. 20, 1892.

Witnesses: Inventor:
Nicolas Strotz.
By Dyrenforth and Dyrenforth
Att'ys (No Model.) 21 Sheets—Sheet 3.

N. STROTZ.
CIGAR BUNCHING MACHINE.

No. 482,882. Patented Sept. 20, 1892.

Witnesses:
Chas. E. Gaylord
Clifford N. White

Inventor:
Nicolas Strotz,
By Dyrenforth & Dyrenforth,
Attys.

(No Model.)  21 Sheets—Sheet 4.

N. STROTZ.
CIGAR BUNCHING MACHINE.

No. 482,882. Patented Sept. 20, 1892.

Witnesses:
Chas. E. Gaylord,
Clifford N. White.

Inventor:
Nicolas Strotz,
By Dyrenforth & Dyrenforth,
Attys.

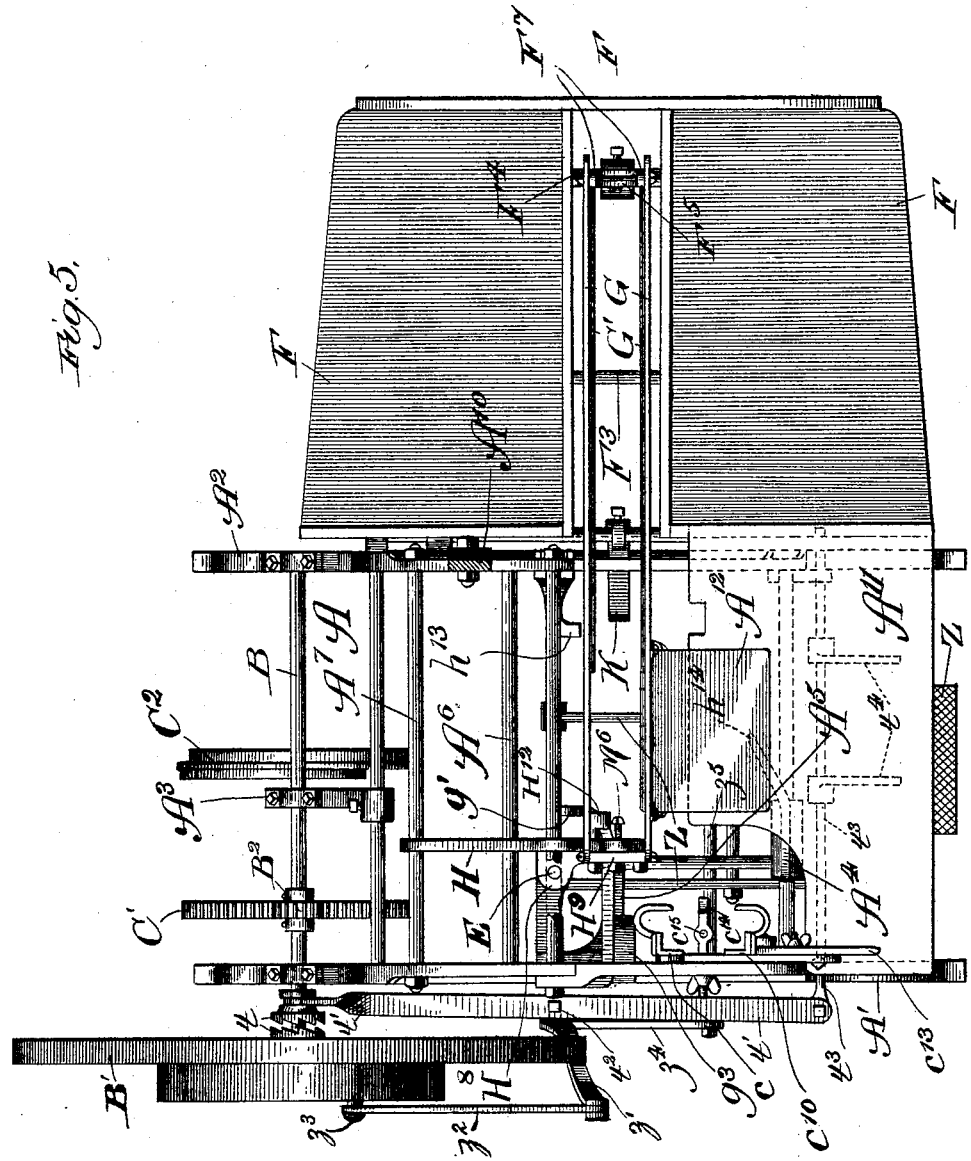

(No Model.) 21 Sheets—Sheet 6.
N. STROTZ.
CIGAR BUNCHING MACHINE.
No. 482,882. Patented Sept. 20, 1892.
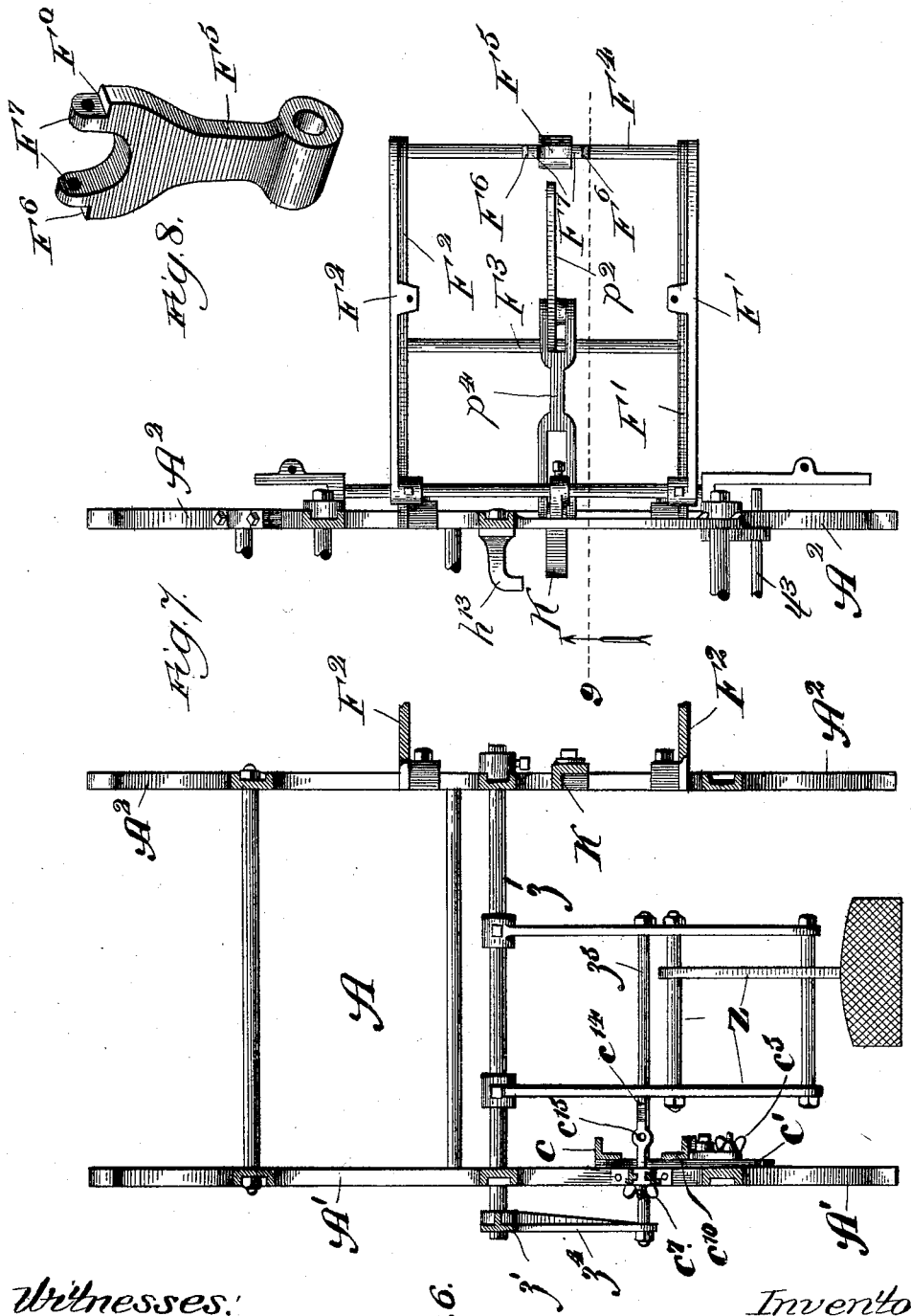

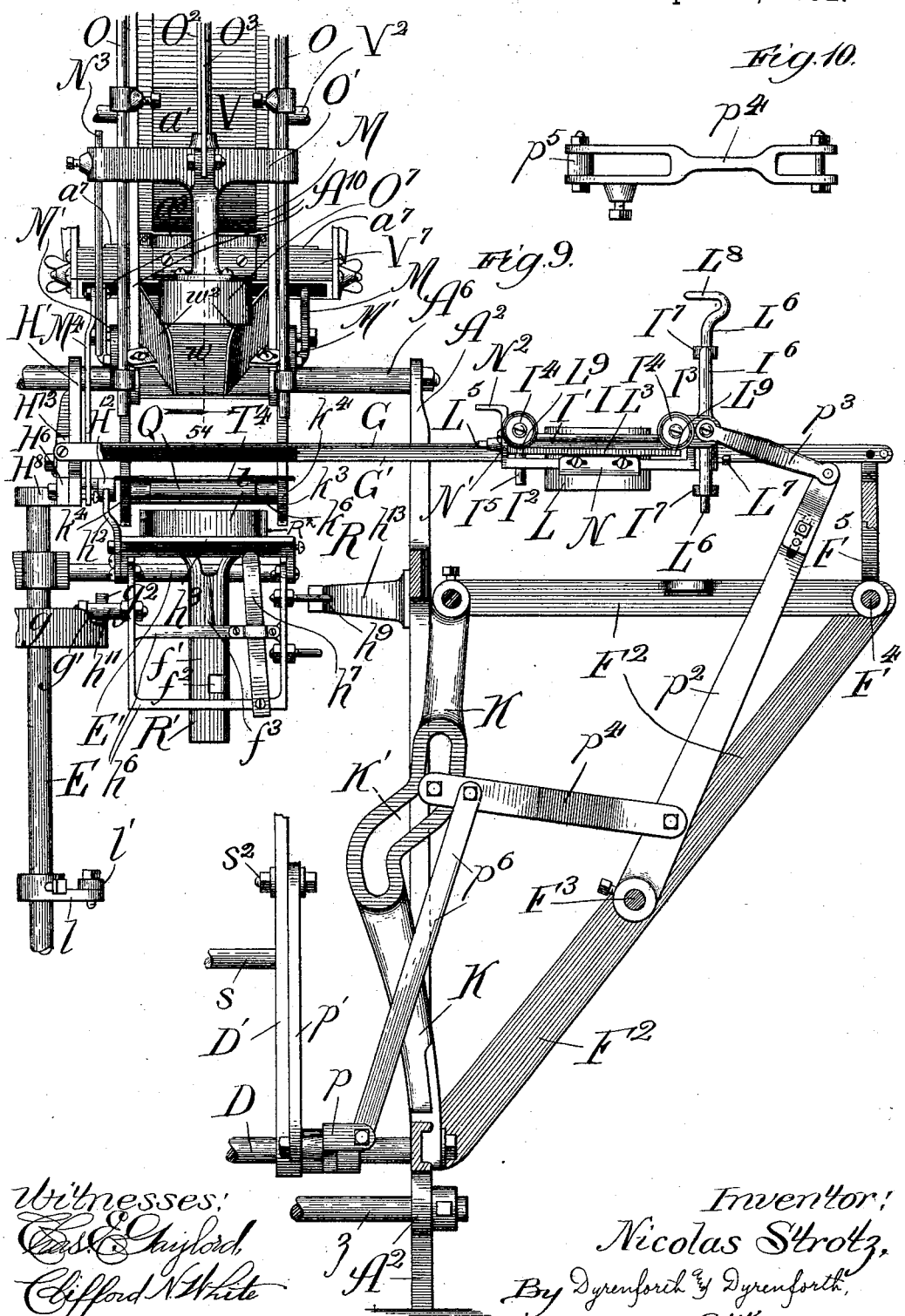

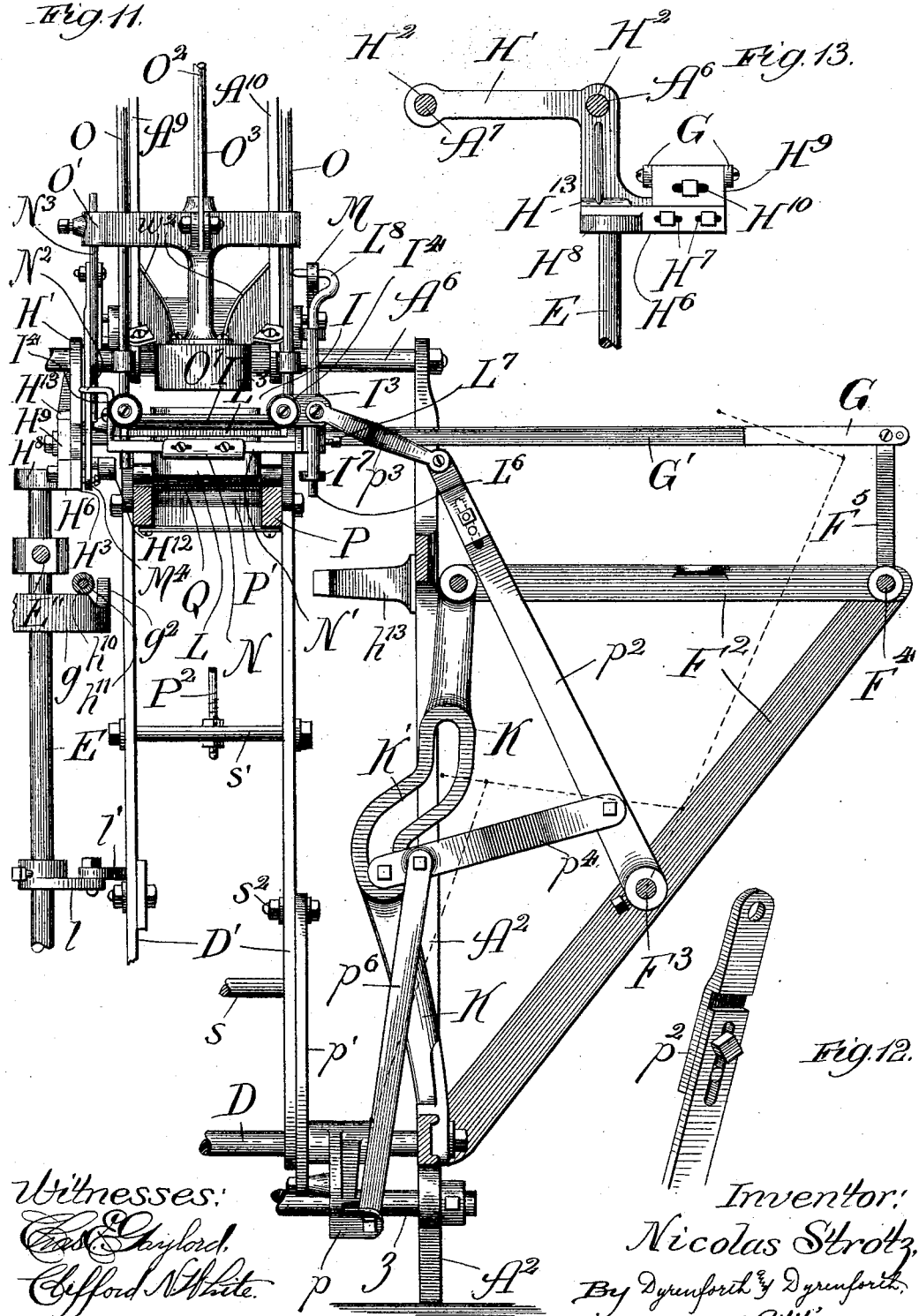

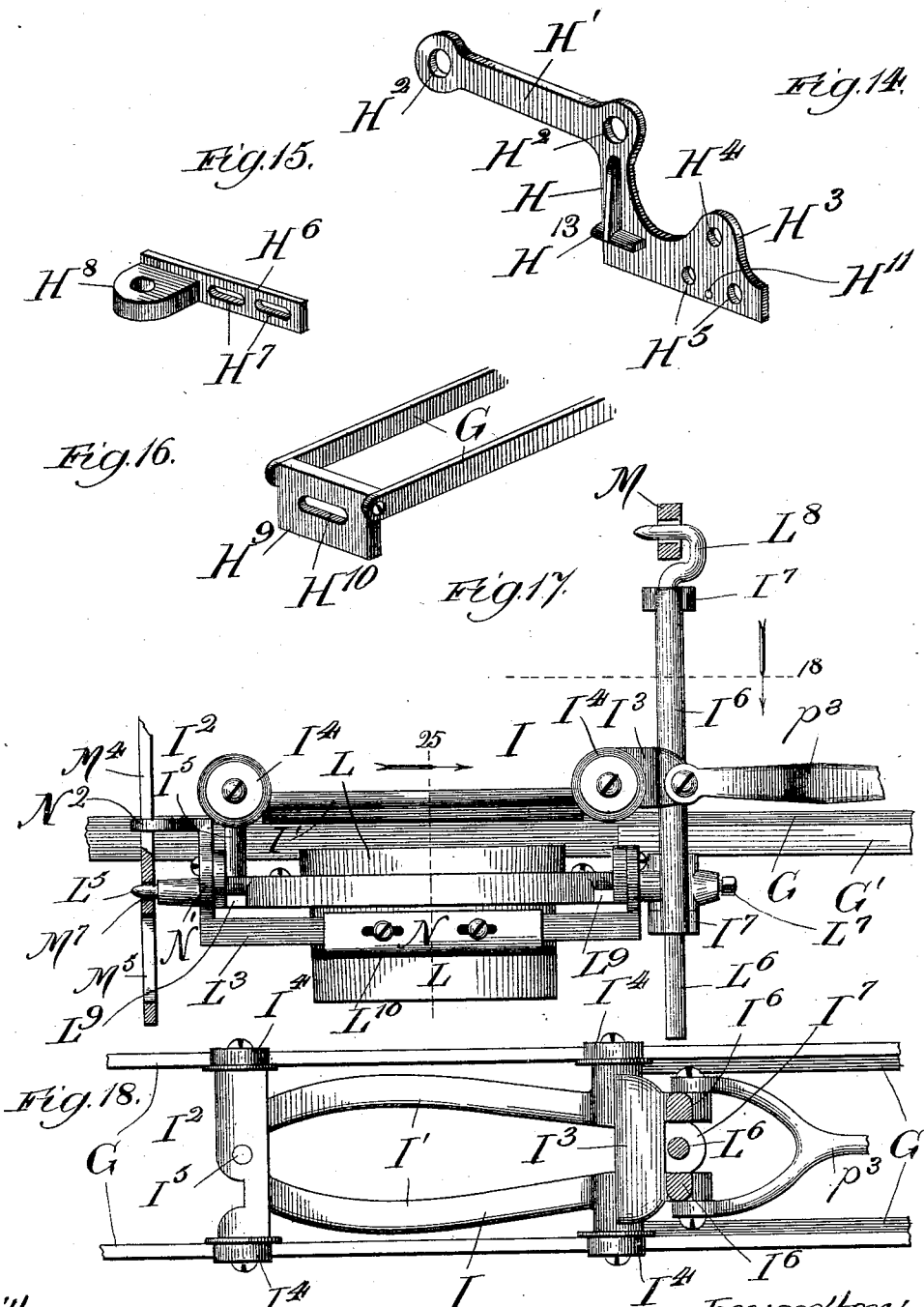

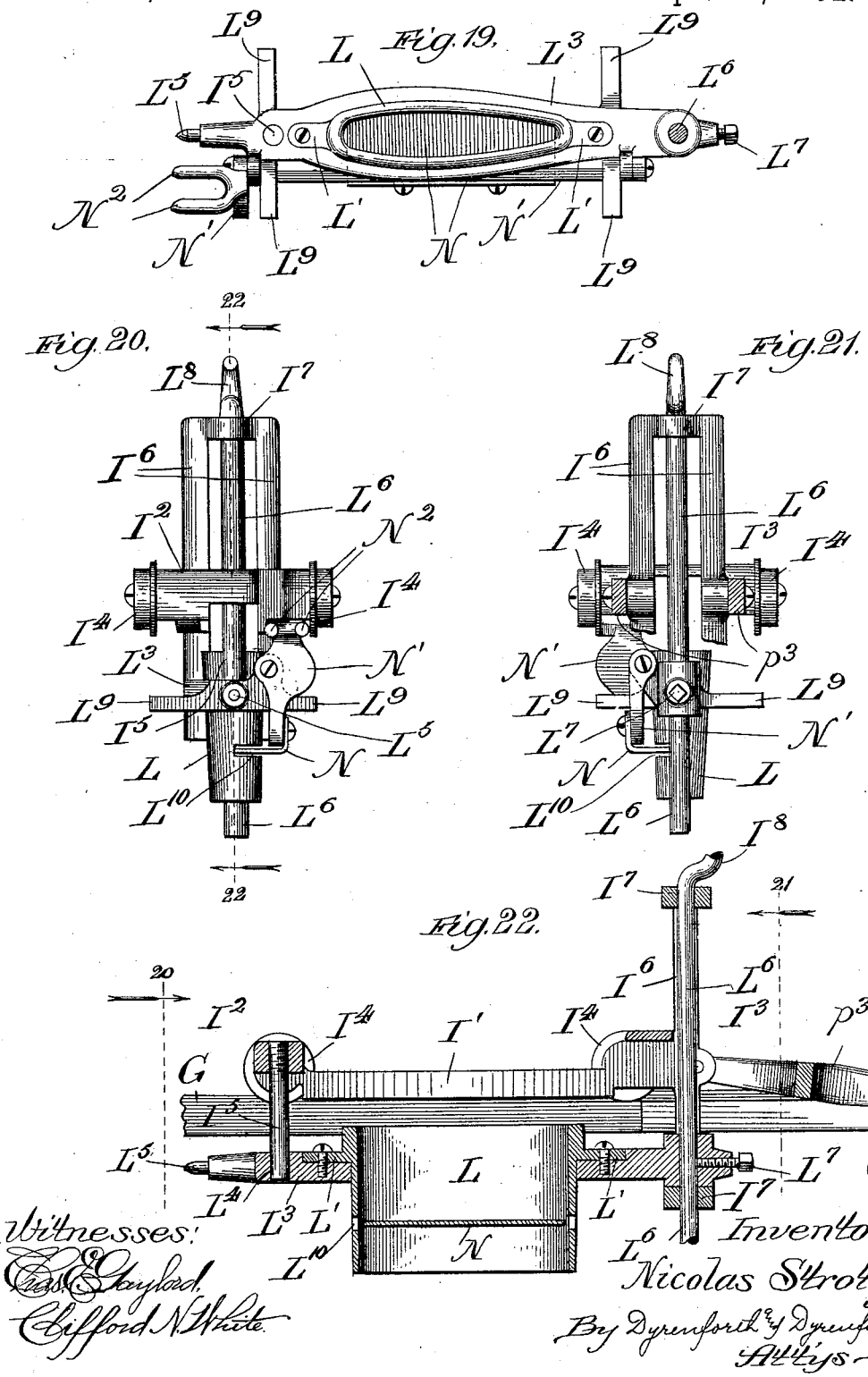

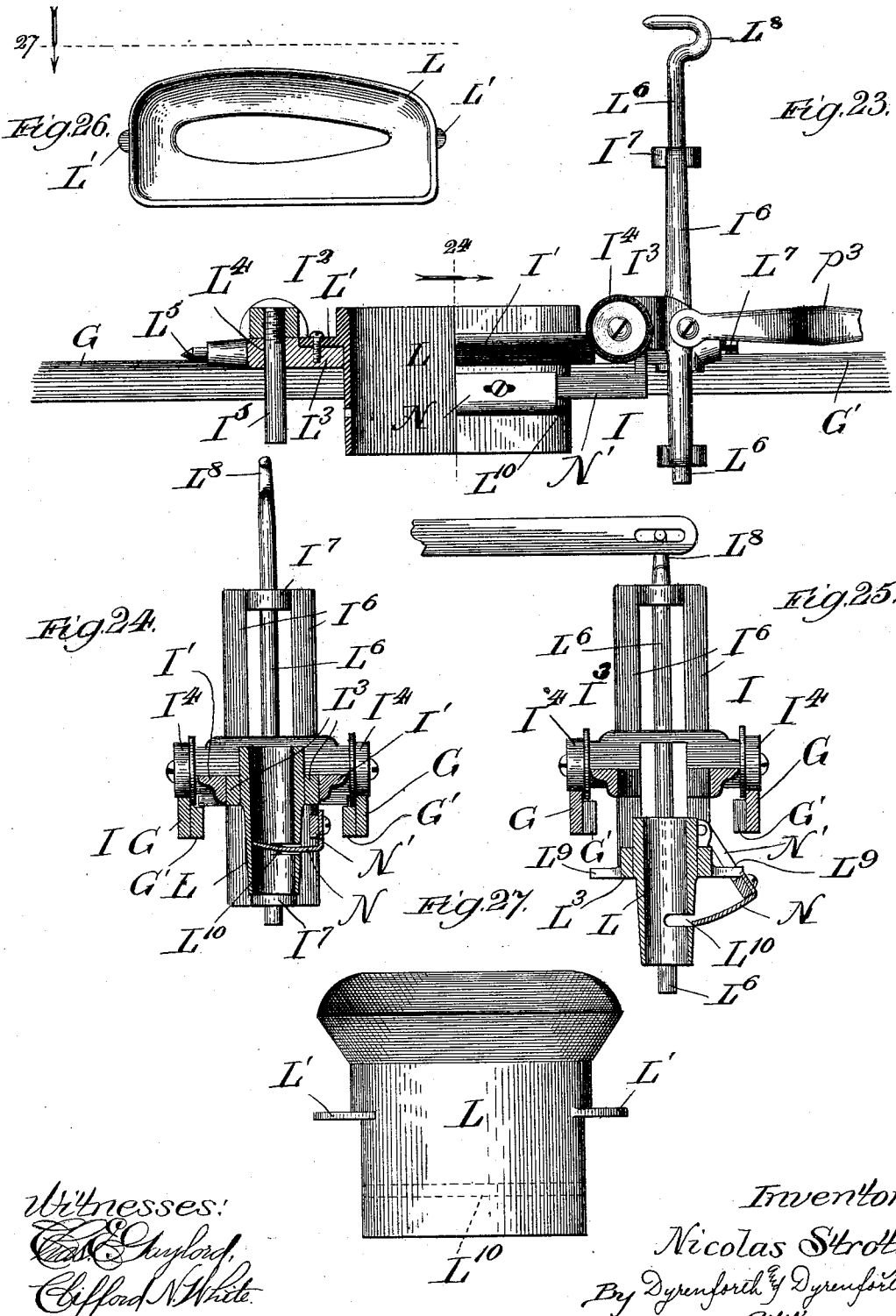

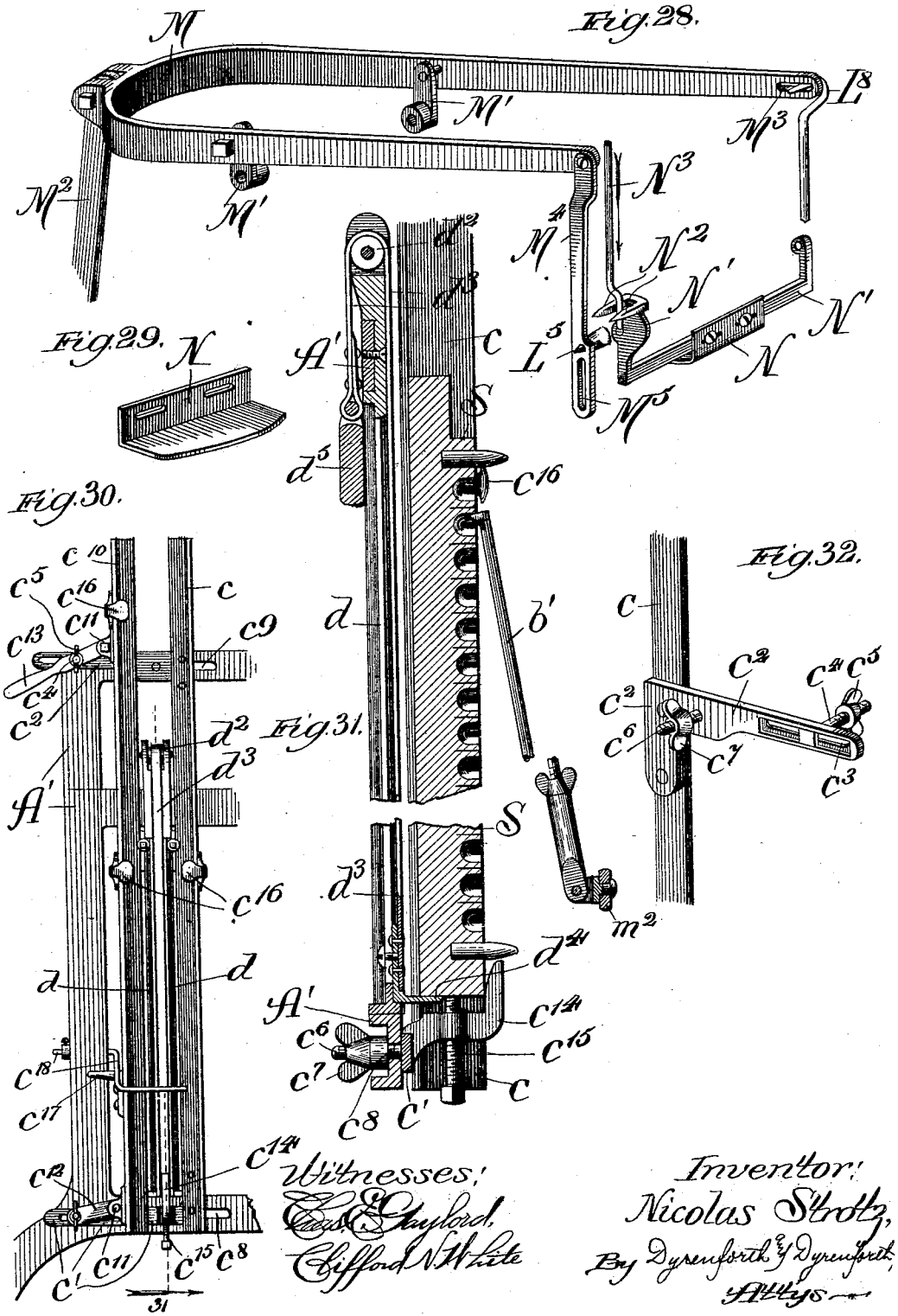

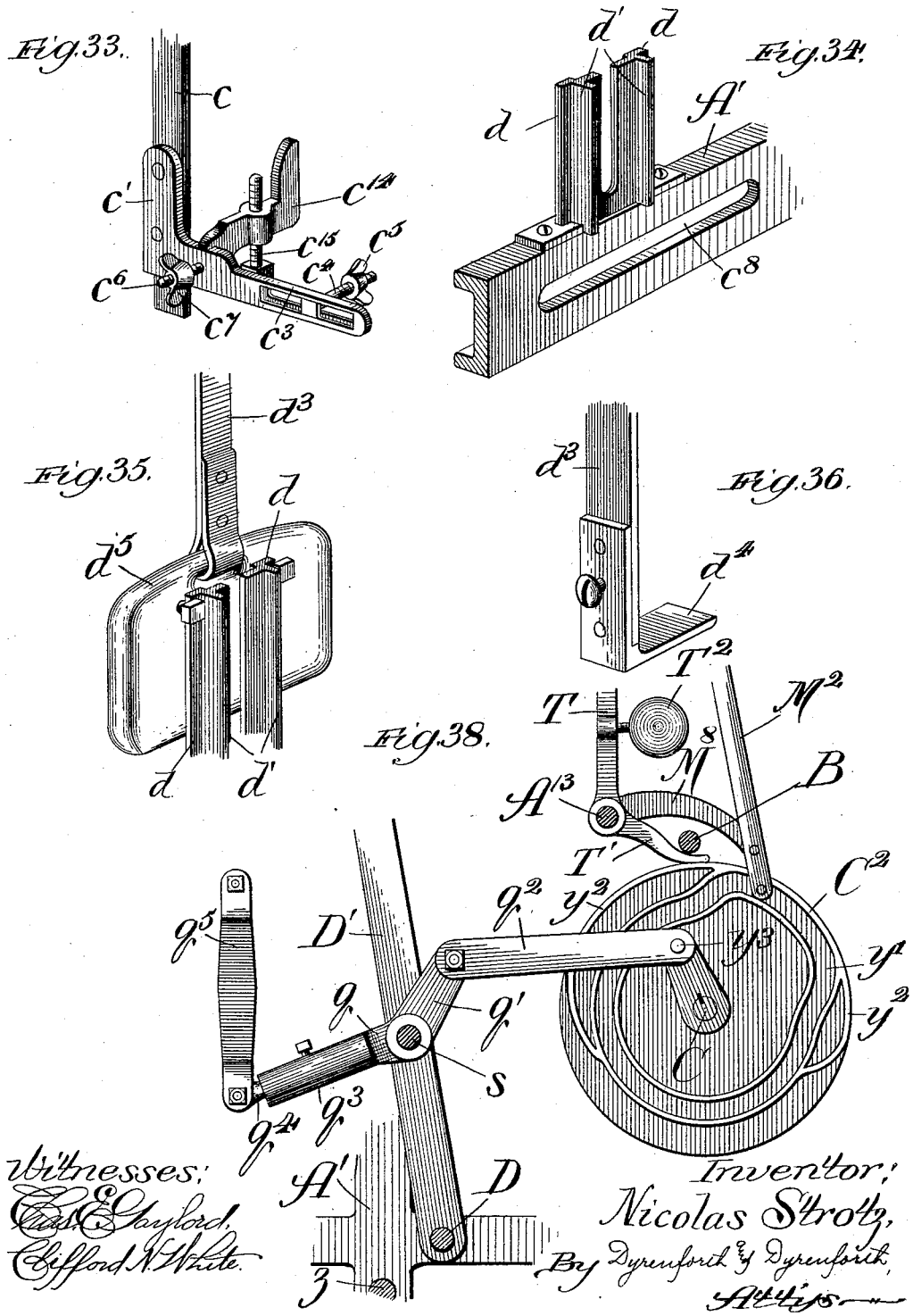

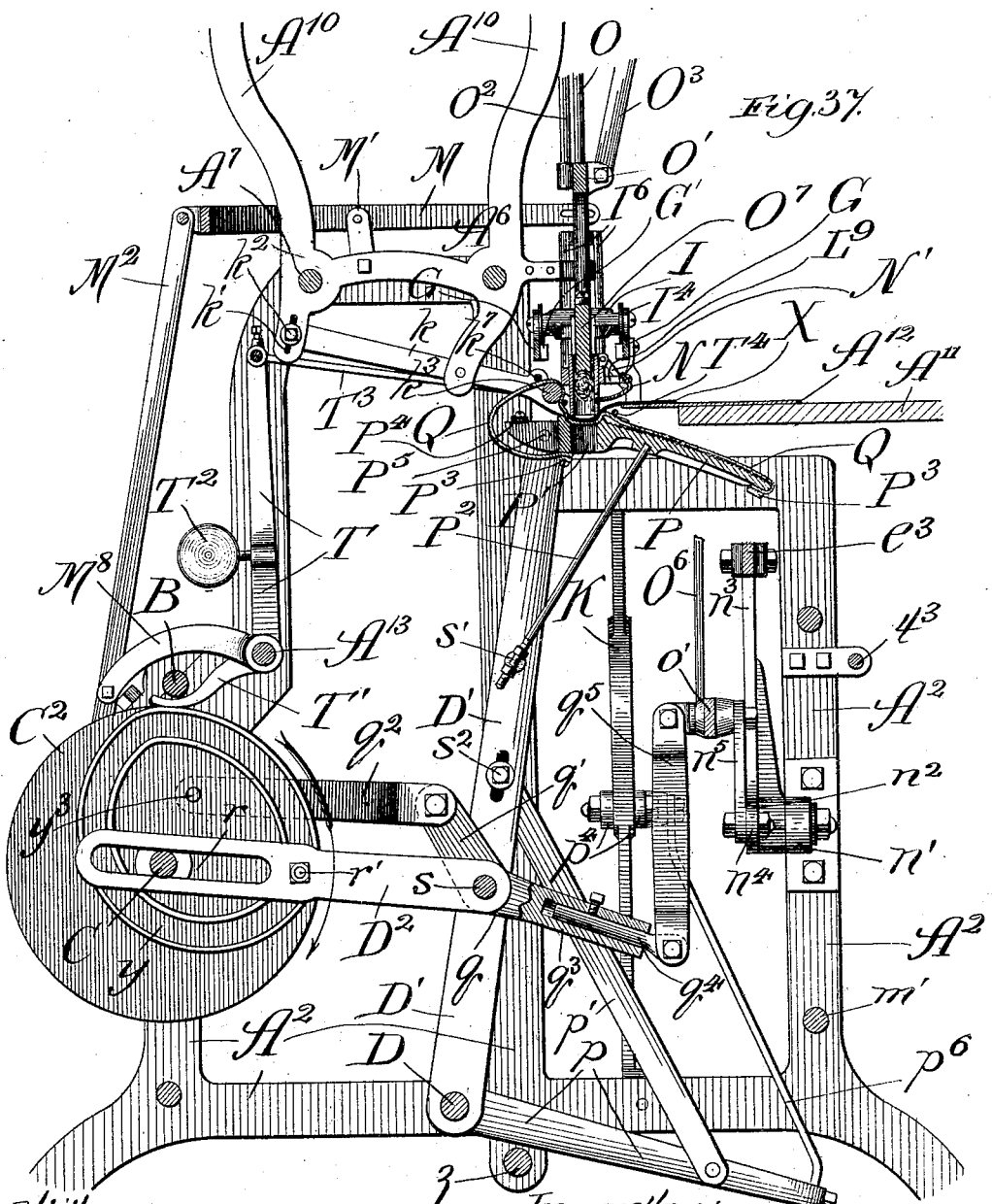

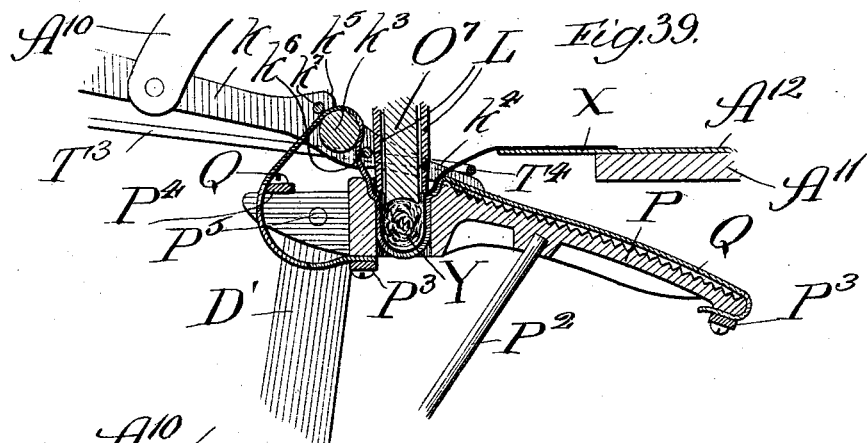
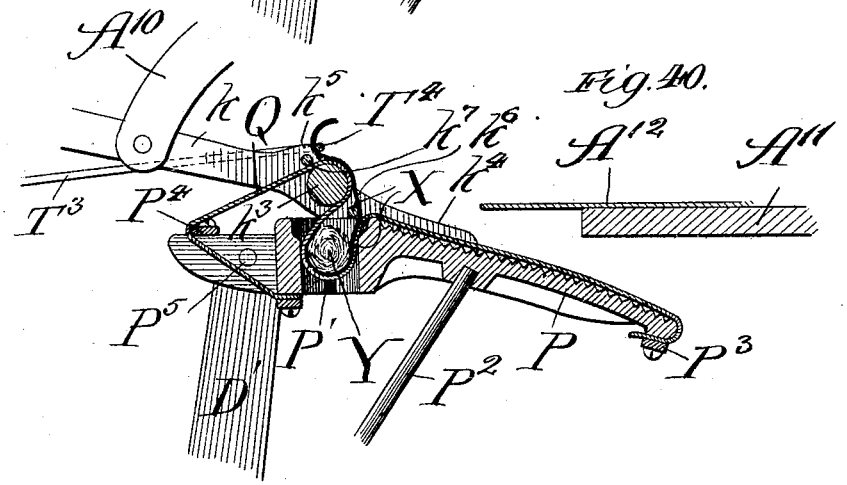
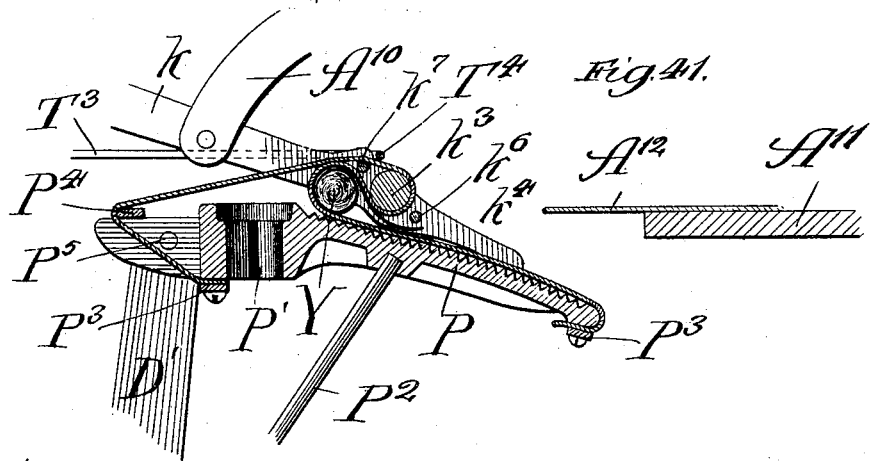

(No Model.) 21 Sheets—Sheet 16.

N. STROTZ.
CIGAR BUNCHING MACHINE.

No. 482,882. Patented Sept. 20, 1892.

Witnesses:
Chas. Gaylord
Clifford N. White

Inventor:
Nicolas Strotz
By Dyrenforth & Dyrenforth
Attys.

(No Model.) 21 Sheets—Sheet 17.
N. STROTZ.
CIGAR BUNCHING MACHINE.
No. 482,882. Patented Sept. 20, 1892.
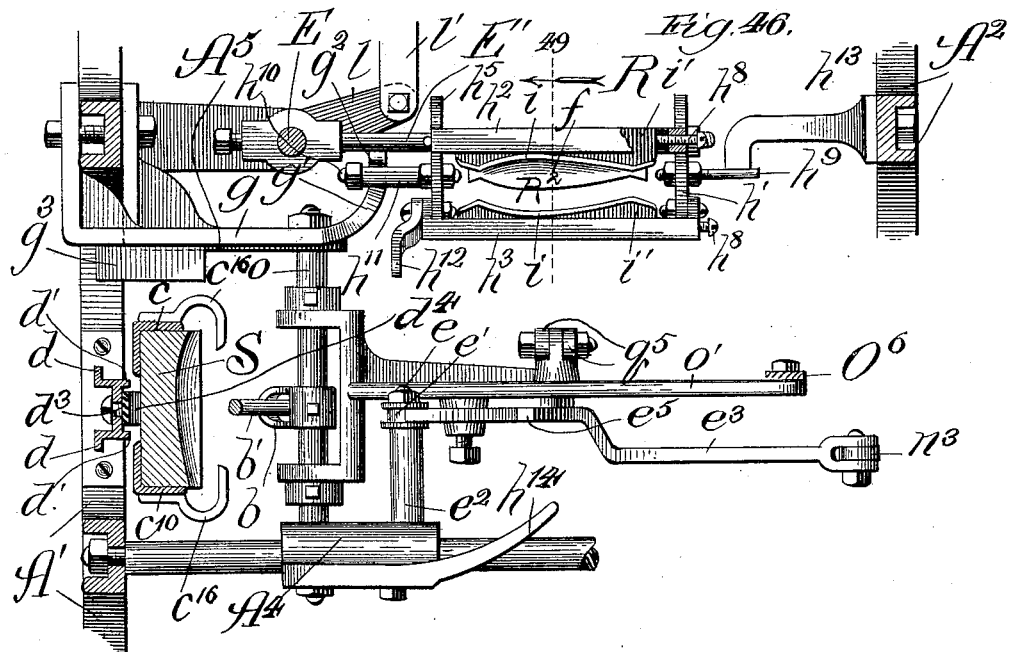
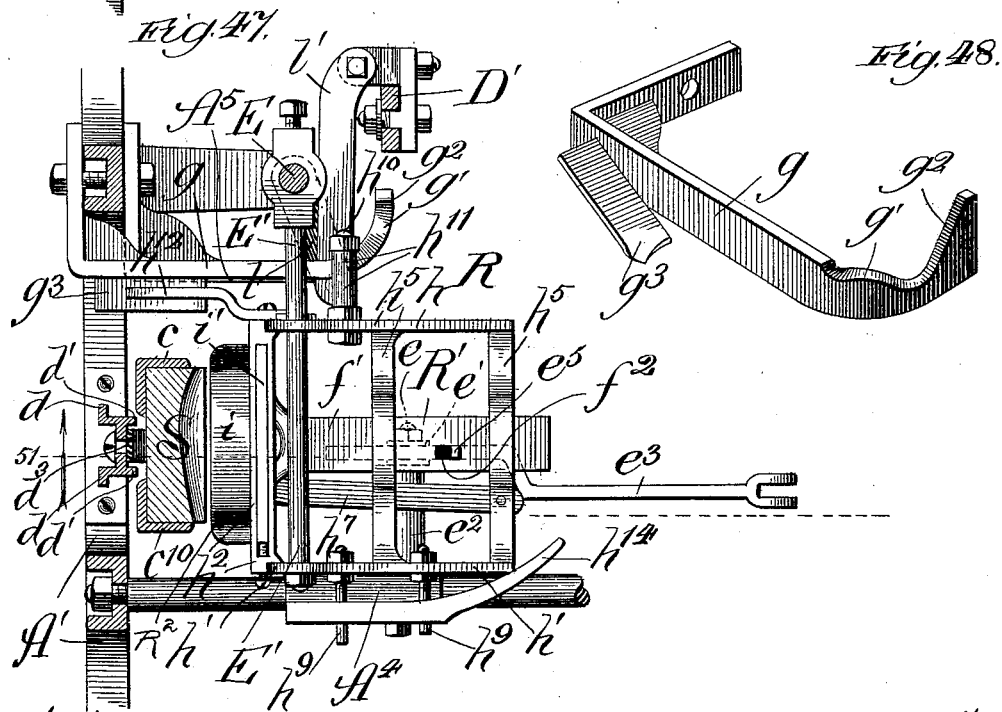
Witnesses: Chas. E. Gaylord. Clifford N. White.
Inventor: Nicolas Strotz,
By Dyrenforth & Dyrenforth,
Attys.

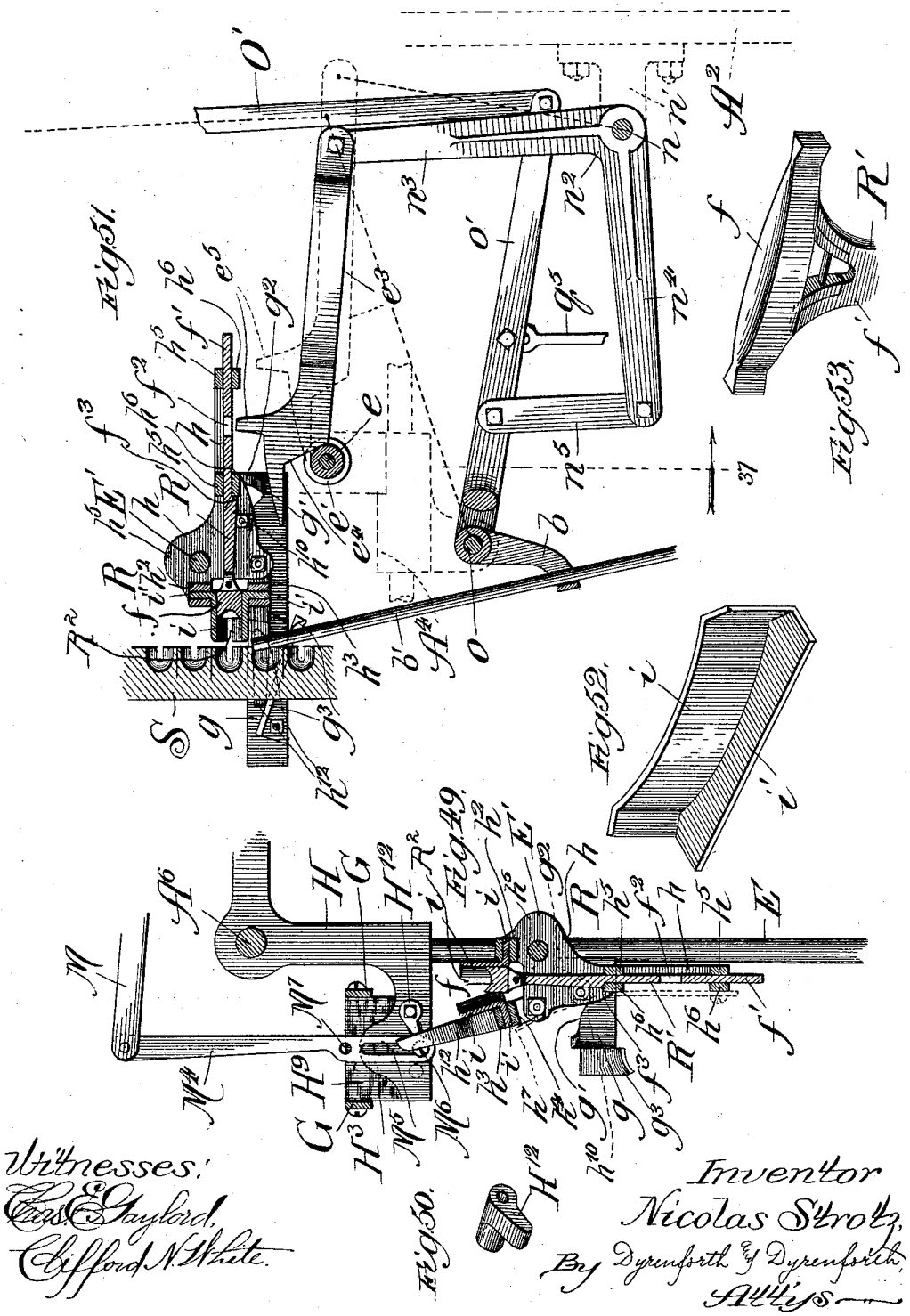

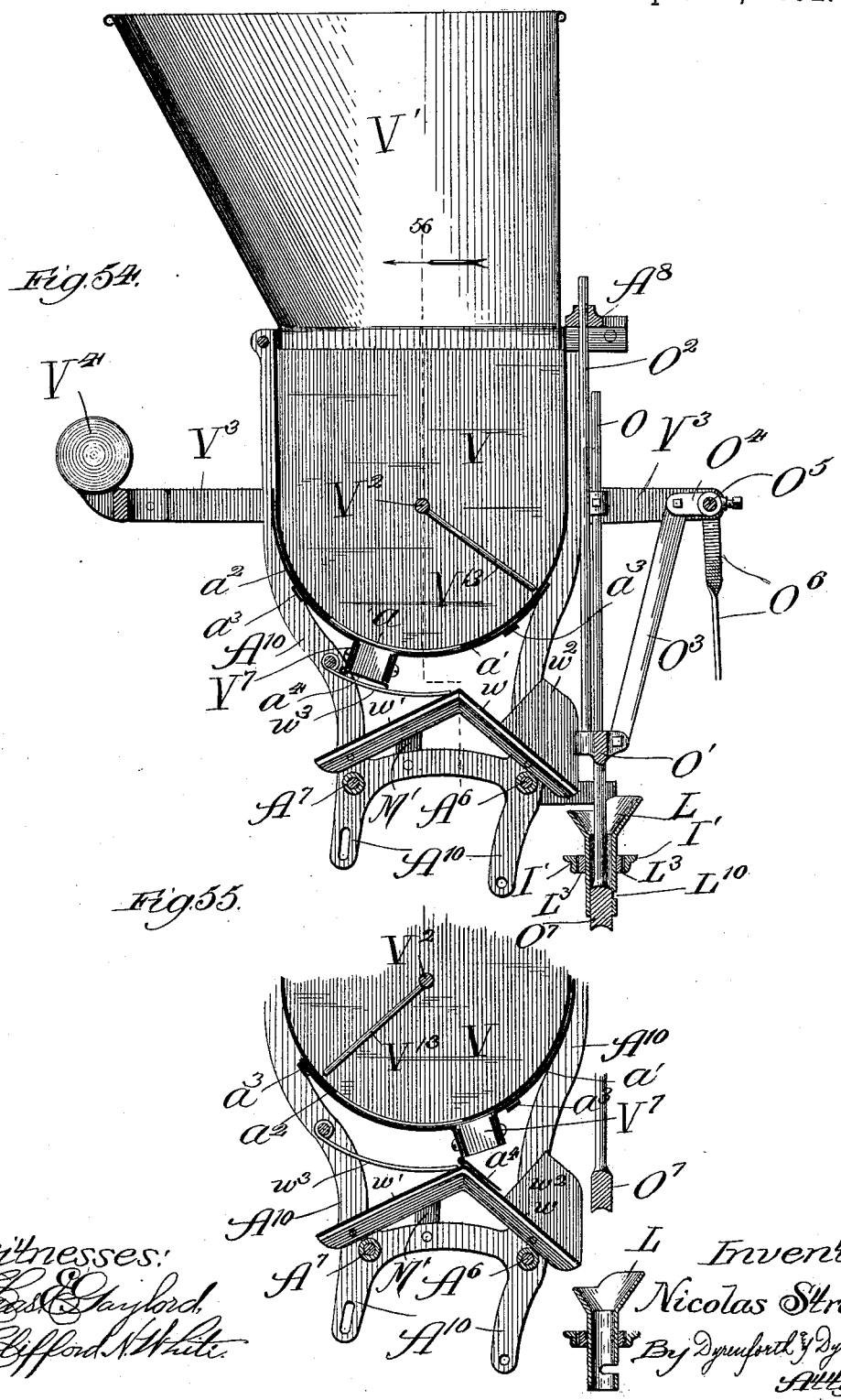

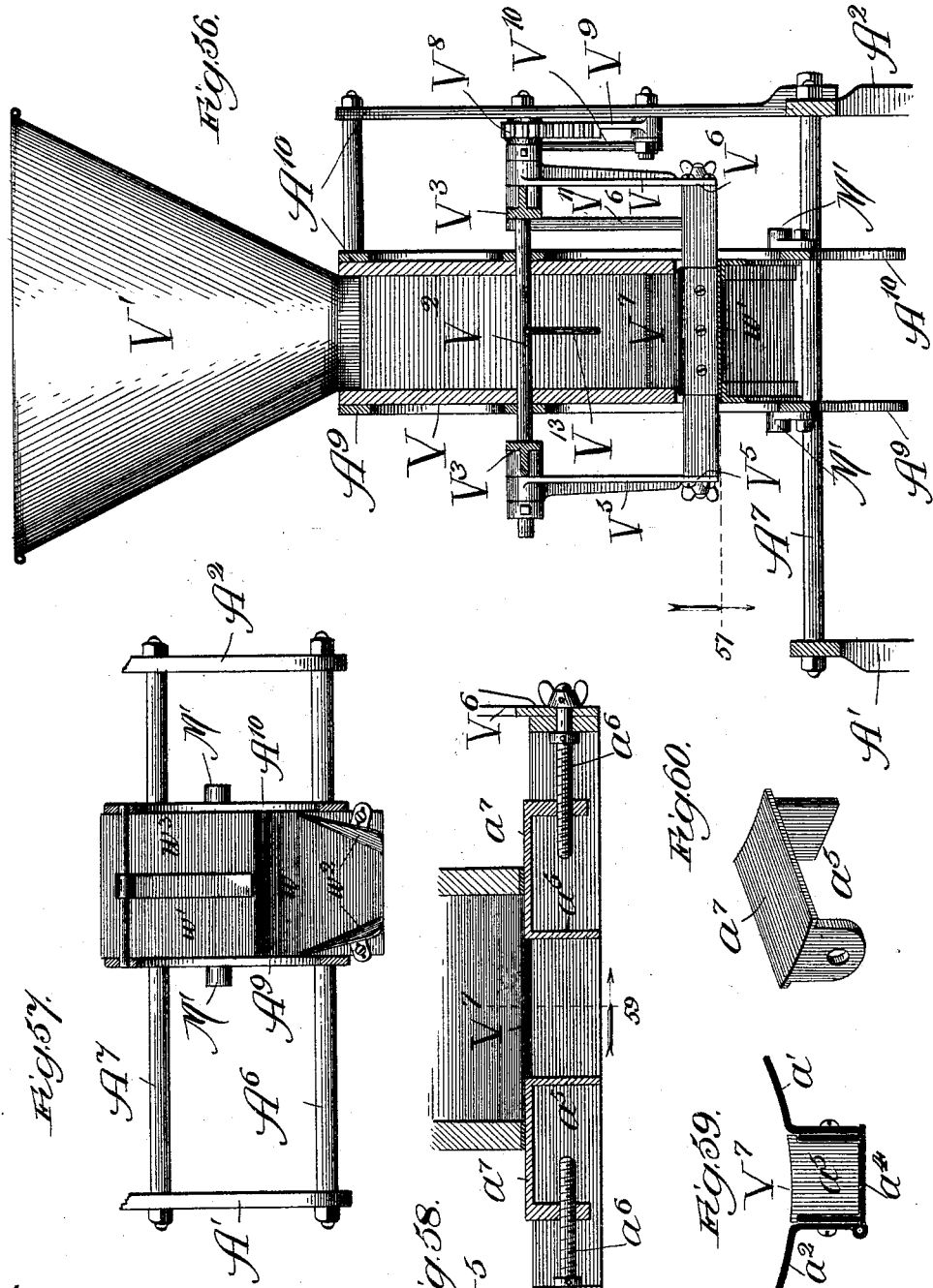

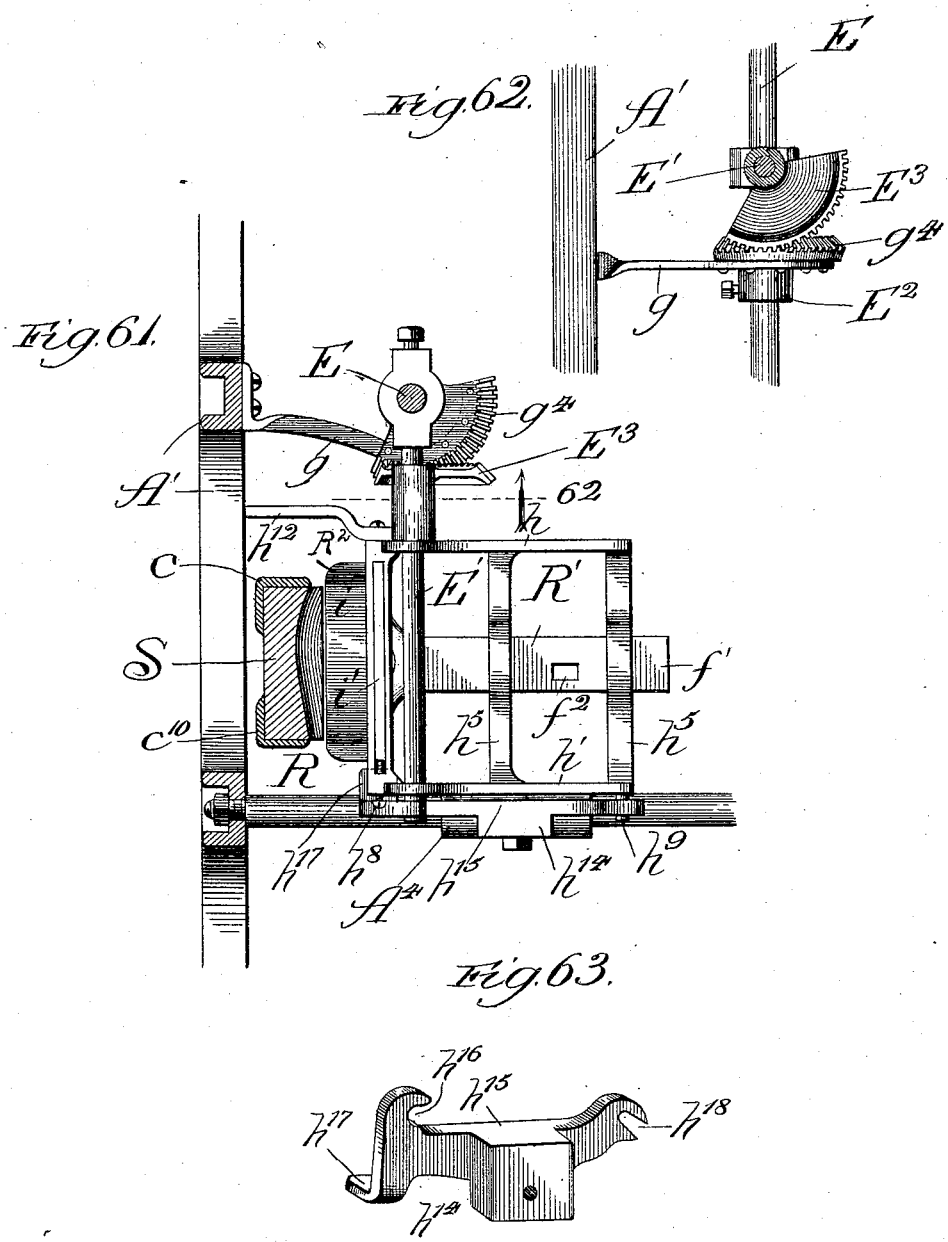

UNITED STATES PATENT OFFICE.

NICOLAS STROTZ, OF CHICAGO, ILLINOIS.

CIGAR-BUNCHING MACHINE.

SPECIFICATION forming part of Letters Patent No. 482,882, dated September 20, 1892.

Application filed April 5, 1892. Serial No. 427,928. (No model.)

*To all whom it may concern:*

Be it known that I, NICOLAS STROTZ, a citizen of the United States, residing at Chicago, in the county of Cook and State of Illinois, have invented a new and useful Improvement in Cigar-Bunching Machines, of which the following is a specification.

My invention relates to cigar-bunching machines, and is more especially in the nature of an improvement upon a machine of this class forming the subject of Letters Patent of the United States granted to William M. Steinle July 26, 1892, No. 479,472. In its general construction my invention is patterned after the construction described and shown in the said patent; and this machine is also intended, broadly, for use in forming cigar-bunches out of either short filler or long filler, or both.

My object is to provide for certain improvements in the general as well as in details of the construction described in the said patent, to the end of adapting the same more perfectly to its purpose.

Figure 1:
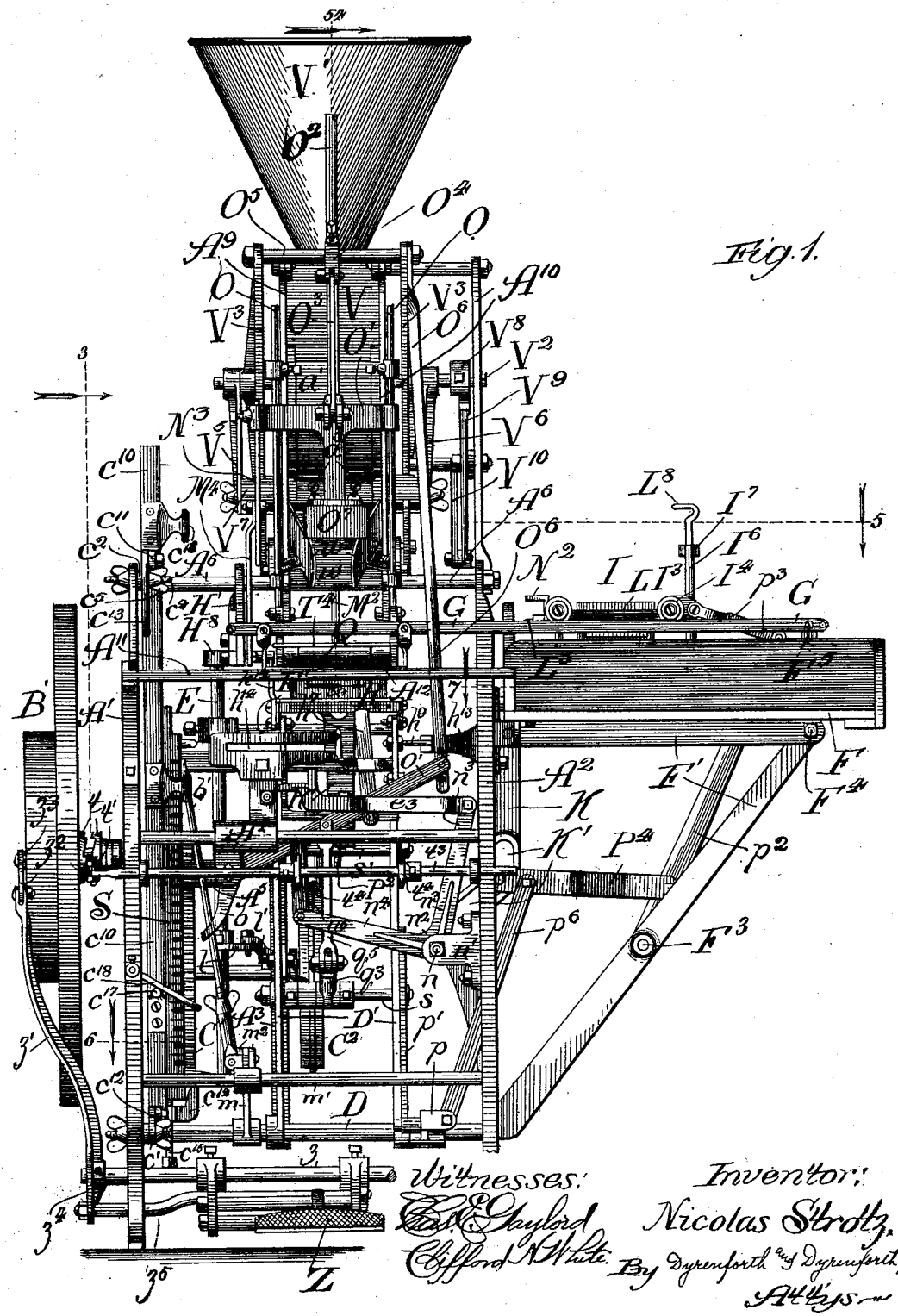
Figure 2:
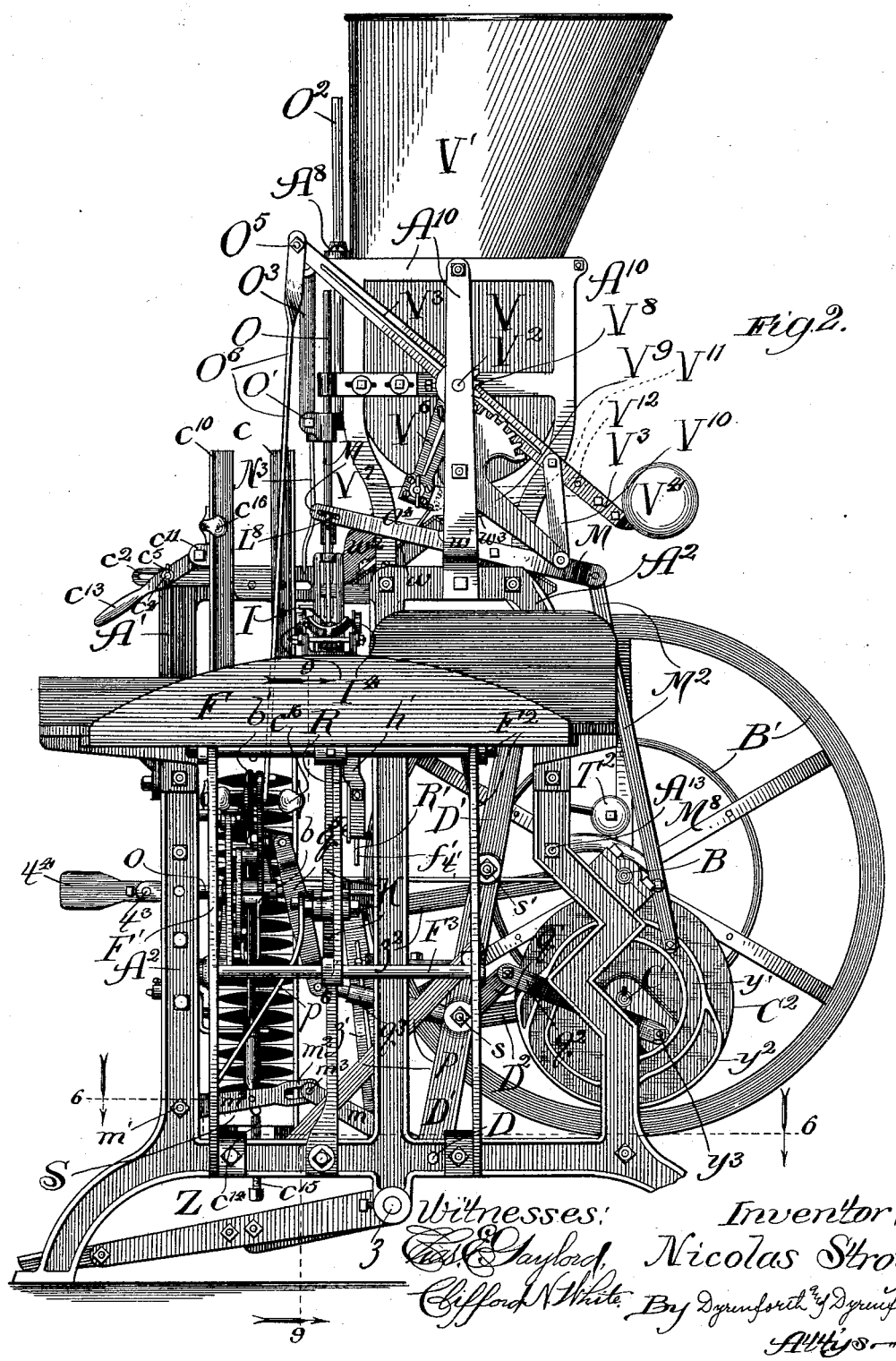
Figure 3:
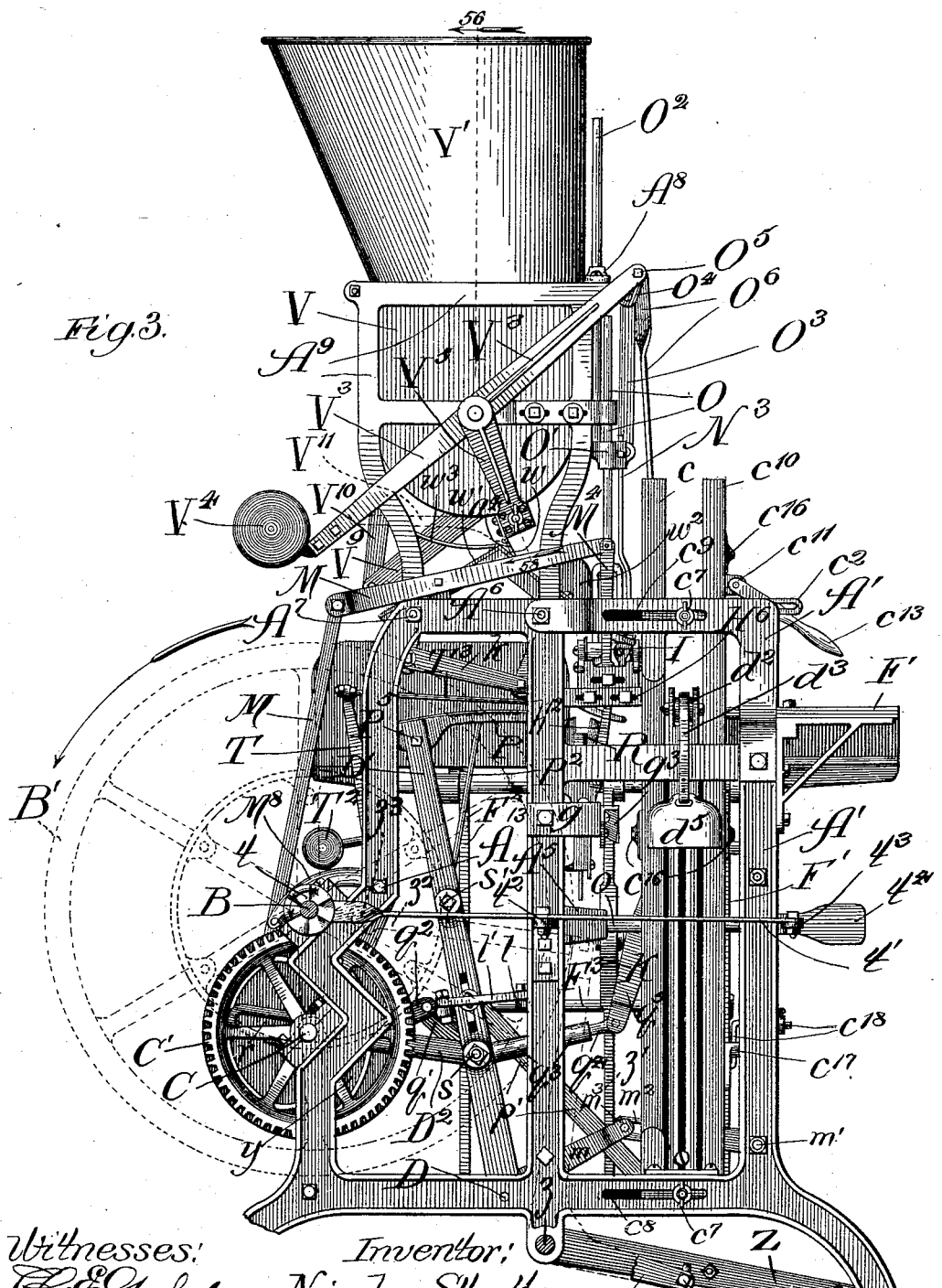
Figure 4:
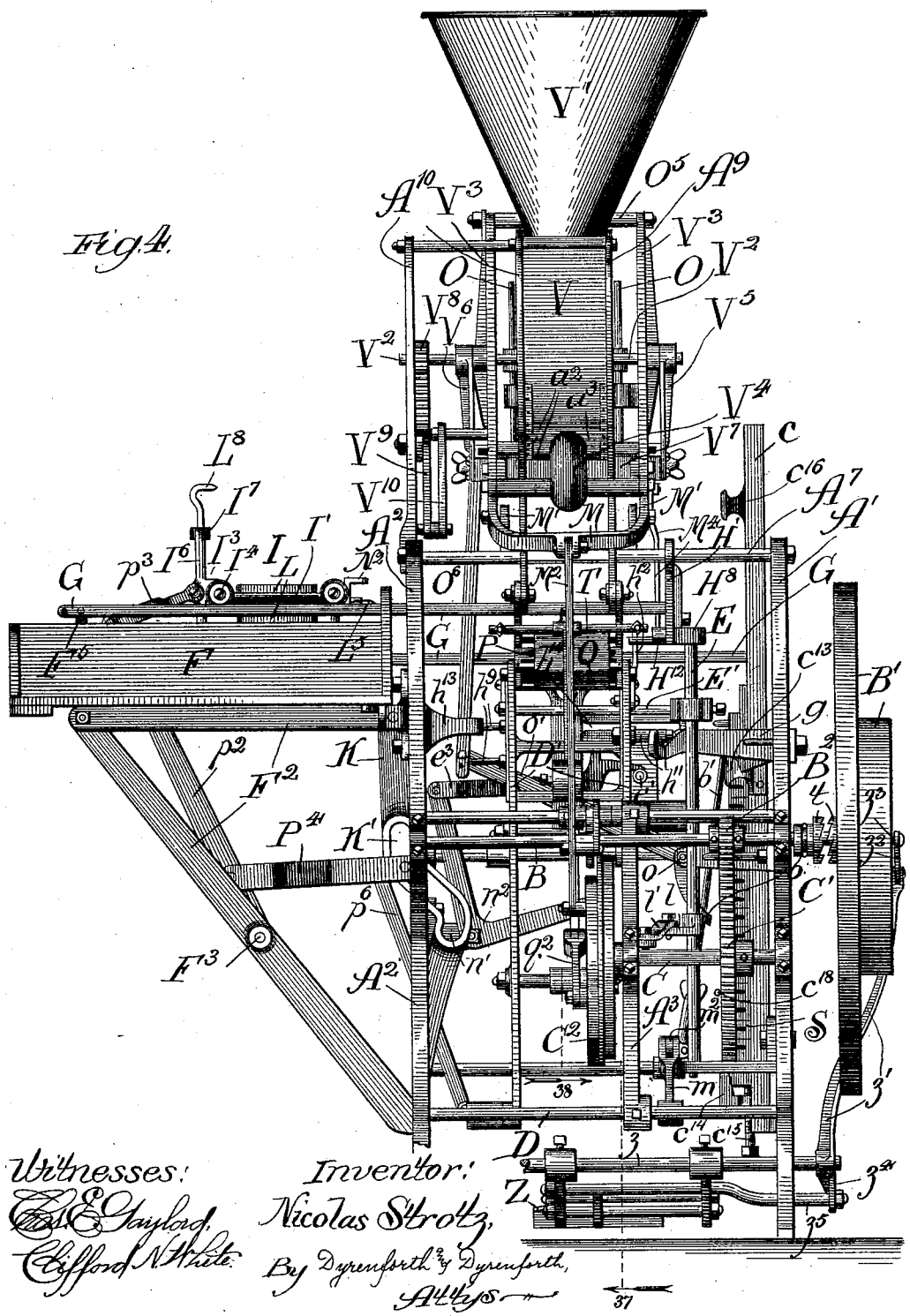
Figure 42:
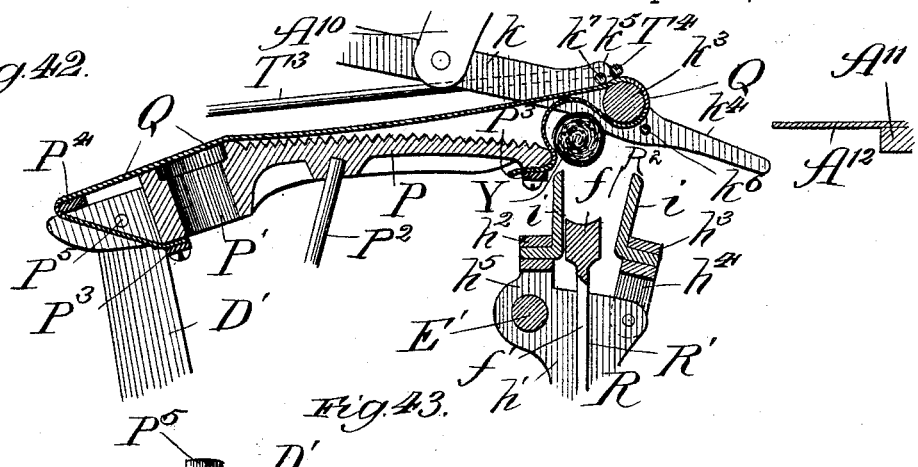
Figure 43:
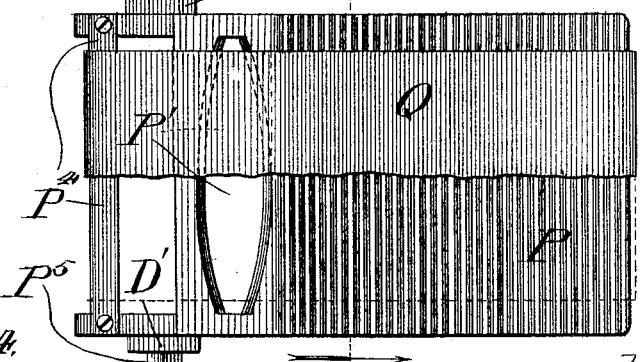
Figure 44:
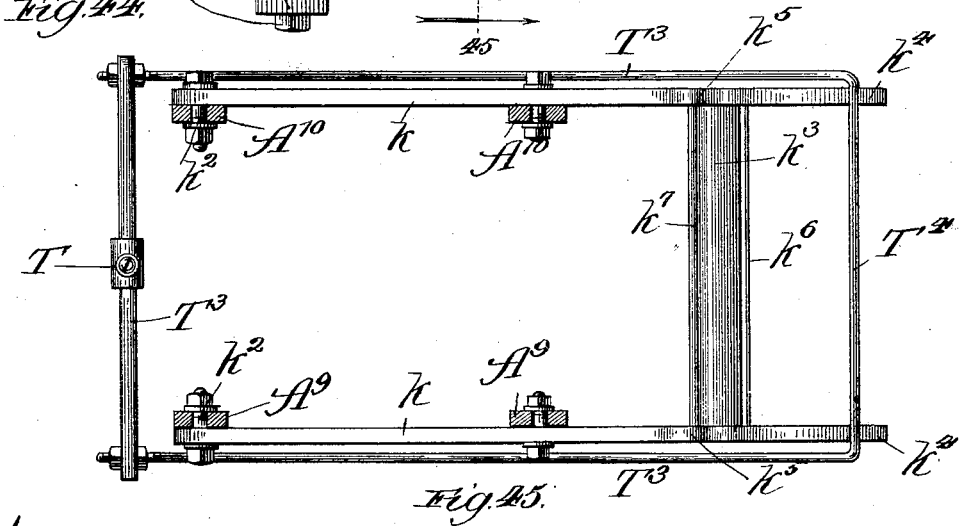
Figure 45:
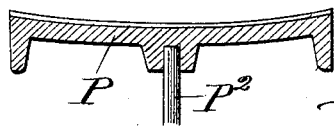

Referring to the drawings, Figure 1 shows my machine in front elevation with part of the base portion broken away; Fig. 2, a view of the right-hand side of the machine; Fig. 3, a section taken on line 3 of Fig. 1, viewed in the direction of the arrow and showing the left-hand elevation of the machine; Fig. 4, a rear elevation; Fig. 5, a plan sectional view taken on line 5 of Fig. 1; Fig. 6, a plan sectional view taken on line 6 6 of Figs. 1 and 2 in the direction of the arrows; Fig. 7, a broken sectional plan view taken on line 7 of Fig. 1, the table being removed; Fig. 8, an enlarged perspective view of a supporting-bracket for the outer end of the carriage-track; Fig. 9, an enlarged broken sectional view taken on line 9 9 of Figs. 2 and 7 in the direction of the arrows and showing the carriage in the receiving position; Fig. 10, a detail view of a connecting-link forming part of the carriage-operating mechanism; Fig. 11, a view similar to Fig. 9, but showing the carriage in its discharge position; Fig. 12, an enlarged broken perspective view of the upper end portion of one of the levers forming part of the carriage-actuating mechanism; Fig. 13, an enlarged broken view, in elevation, of the supporting-bracket for the track adjacent to the left-hand side of the machine; Figs. 14, 15, and 16, enlarged perspective views of details entering into the construction of the bracket shown in Fig. 13, Fig. 16 also showing a broken portion of the track; Fig. 17, a broken sectional view showing the carriage in its discharge position, the inner telescoping portion of the same being lowered; Fig. 18, a broken sectional plan view showing the upper end of the outer telescoping section of the carriage, the section being taken from line 18 of Fig. 17; Fig. 19, a plan view, partly sectional, of the inner telescoping section of the carriage and parts carried thereby; Fig. 20, an end elevation of the carriage, the view being taken from line 20 of Fig. 22; Fig. 21, a section taken on line 21 of Fig. 22; Fig. 22, a section taken on line 22 22 of Fig. 20; Fig. 23, a view, partly in section and partly in elevation, of the carriage, the inner telescoping section thereof being in its raised position; Fig. 24, a section taken on line 24 of Fig. 23 in the direction of the arrows; Fig. 25, a broken section on the same line as Fig. 24, but showing the inner telescoping section lowered and the gate or valve opened; Fig. 26, a top plan view of a modified construction of the mold carried by the inner telescoping section of the carriage; Fig. 27, a side elevation of the mold shown in Fig. 26, the view being taken from line 27 in that figure; Fig. 28, an enlarged broken perspective view of details detached, but placed in operative relation and illustrating a rocking yoke which engages and reciprocates the inner telescoping section of the carriage and a reciprocating cam-rod which engages and opens the valve of the mold; Fig. 29, an enlarged perspective view of the valve detached from the mold; Fig. 30, an enlarged broken view, in elevation, of the mold-board retaining and guiding mechanism; Fig. 31, an enlarged broken section taken on line 31 of Fig. 30 and viewed in the direction of the arrow; Fig. 32, an enlarged broken perspective view of the rigid mold-board guide and one of its adjusting-brackets detached from the machine; Fig. 33, an enlarged perspective view of the lower end portion of the rigid mold-board guide and adjusting-bracket therefor detached from the machine; Fig. 34, a broken perspective view, enlarged, of the mold-board-guiding frame; Fig. 35, a similar view of another portion of the same, showing the counterbalancing-weight for the mold-board; Fig. 36, a similar view of the end of the mold-board-counterbalancing mechanism which engages the mold-board; Fig. 37, an enlarged broken section taken on line 37 of Figs. 4 and 51 and viewed as indicated by the arrows; Fig. 38, an enlarged broken section on line 38 of Fig. 4, viewed in the direction of the arrow and showing only certain details; Figs. 39, 40, 41, and 42, enlarged details in section, the section being taken on line 39 of Fig. 1 and showthe bunch-rolling mechanism in four different positions, illustrating as many stages in the formation of a bunch; Fig. 43, a plan view of the bunch-rolling table, half of the forming-belt being removed for purposes of the illustration; Fig. 44, a sectional detail plan view of the binder-tensioning mechanism; Fig. 45, a broken section of the rolling-table, taken on line 45 of Fig. 43 in the direction of the arrow; Fig. 46, an enlarged plan sectional view showing the reciprocating carrier which transfers the bunch from the rolling mechanism to the mold-board in the position to receive the bunch; Fig. 47, a view similar to the last, showing the carrier in position to discharge the bunch into the mold-board; Fig. 48, an enlarged broken perspective view of a cam-guide for swinging the carrier between its vertical and horizontal positions in the movement thereof between its receiving and discharge positions; Fig. 49, a broken section taken on line 49 of Fig. 46 and viewed in the direction of the arrow; Fig. 50, an enlarged perspective view of a stop shown in Fig. 49, but detached from its support; Fig. 51, a broken sectional view taken on line 51 of Fig. 47 and viewed in the direction of the arrow; Fig. 52, an enlarged perspective view of one of the shaper-plates of the swinging carrier; Fig. 53, an enlarged perspective view of the head portion of the swinging-carrier plunger or ejector; Fig. 54, an enlarged section taken on line 54 of Figs. 1 and 9, viewed in the direction of the arrows and showing the receiving-box for short filler in its receiving position; Fig. 55, a broken view on the same line as Fig. 54, but showing the short-filler box in its discharge position; Fig. 56, a section taken on line 56 of Figs. 3 and 54 and viewed as indicated by the arrows; Fig. 57, a plan sectional view on line 57 of Fig. 56; Fig. 58, a longitudinal section of the short-filler-receiving box, the section being taken on line 58 of Fig. 3 and enlarged; Fig. 59, a broken section taken on line 59 of Fig. 58; Fig. 60, an enlarged perspective view of one of the adjustable ends of the short-filler-receiving box detached; Fig. 61, a broken plan sectional view illustrating the carrier which transfers the bunch from the rolling-table to the mold-board and operating mechanism therefor of a construction somewhat more simple than the operating mechanism illustrated in previous figures. This view corresponds substantially with Fig. 47 except as to the changes in construction of the carrier-operating mechanism. Fig. 62 is a broken section taken on line 62 of Fig. 61, viewed in the direction of the arrow; and Fig. 63, a perspective view of a bracket-bearing of the form I prefer to employ with the construction shown in Fig. 61.

The main frame A of the machine is formed of side frames A' A$^2$, held together in rigid relation by tie-bars, which also afford bearings for various parts of the machine.

B is the drive-shaft, carrying a loose fly-wheel and pulley B'. The fly-wheel and pulley are fastened together, and integral therewith is one of the members of a clutch $t$, the other member of which is mounted upon the drive-shaft B to rotate with the shaft, but to have limited longitudinal play thereon, whereby it may be moved into and out of engagement with the first-named clutch member. The drive-pulley may be belted to a suitable driving power and the drive-shaft of the machine may by means of the clutch be thrown into and out of engagement therewith.

The clutch mechanism is operated by shipping mechanism comprising a rod $t'$, (see Fig. 5,) pivoted between its ends to the side frame A' at $t^2$ and extending to the front of the machine, where it is pivotally connected at its end to a longitudinally-movable rod $t^3$ in bearings on the frames A' A$^2$. Upon the rod $t^3$ are keyed forward-extending arms $t^4$ $t^4$ far enough apart to receive between them the operator's knee. The clutch member upon the shaft B is provided with a circumferential groove into which the end of the bar $t'$ extends. Pressure exerted against one of the arms $t^4$ in the direction of the side frame A$^2$ moves the shipping mechanism in the direction of causing engagement of the clutch members to start the machine, and pressure exerted against an arm $t^4$ in the direction of the side frame A' causes the clutch members to be disengaged and the machine to be stopped. The machine may also be operated by foot-power, if desired, and for this purpose I provide a treadle Z, secured at its end to a rock-shaft $z$, carrying an upward-extending arm $z'$. At its upper end the arm $z'$ is connected pivotally to a link $z^2$, adapted at its opposite end to be readily connected to or disengaged from a pin $z^3$ on the drive-pulley. When connected, the pulley may be rotated by means of the treadle. For further strength a forward-extending arm $z^4$ is formed integral with the arm $z'$ and pivotally connected to the end of a rod $z^5$ upon the treadle.

On the drive-shaft B is a pinion B$^2$. Parallel with the shaft B and below the latter is a shaft C, mounted at one end in a bearing on the side frame A' and at its opposite end in a vertical bar A$^3$, forming part of the main frame of the machine. On the shaft C is a gear-wheel C', which meshes with the pinion B$^2$ and is driven thereby. On the end of the shaft C beyond its bearing A$^3$ is a cam-wheel C$^2$. On its side adjacent to the side frame A' the wheel C$^2$ is provided with a cam-groove $y$, (see Fig. 37,) and on its side adjacent to the side frame $A^2$ it is provided with a cam-groove $y'$ and outer cam-surface $y^2$. (See Fig. 38.)

Near the base and center of the machine is a rock-shaft D, mounted in bearings in the side frames. Keyed at its lower ends to the rock-shaft D is an upward-extending rocking frame D', comprising side bars held in rigid relation to each other by tie-rods $s\ s'$.

$D^2$ is a link pivoted at its forward end to the rod $s$ of the rocking frame and provided along its rear end portion with a slot $r$, through which passes the shaft C. Between its ends the link $D^2$ carries a roller at $r'$, Fig. 37, which travels in the cam-groove $y$. The link extends between the wheel $C^2$ and bearing $A^3$, and the latter keeps the link from being moved laterally, and thus maintains the roller in the cam-groove $y$. Rotation of the wheel $C^2$ causes its cam $y$ to move the link $D^2$ longitudinally and rock the frame D', and through it the rock-shaft D.

On the face of the wheel $C^2$ adjacent to the side frame $A^2$ is an eccentric-pin $y^3$.

Fulcrumed upon the rod $s$ of the rocking frame is a bell-crank lever $q$, having the rearward-extending arm $q'$, pivotally connected by means of a link $q^2$ with the eccentric-pin $y^3$ on the wheel $C^2$ (see Fig. 38) and having a forward-extending arm $q^3$, provided with an adjustable extension $q^4$. As the wheel $C^2$ rotates and through the medium of the link $D^2$ rocks the frame D' the bell-crank lever $q$ moves forward and back with the rocking frame and is also given a limited independent rocking motion in the vertical plane by its independent link connection with the wheel $C^2$ described.

Keyed to the rock-shaft D, adjacent to the side frame $A^2$, is a forward-extending arm $p$, which rocks with the shaft D and is braced by a rod $p'$, which extends therefrom to the rocking frame D', being connected to the latter at $s^2$, as most clearly shown in Figs. 9 and 37.

Secured in bearings $A^4\ A^5$, forming part of the main frame of the machine, adjacent to the side frame A' and extending parallel with the latter, is a shaft $o$, (see Figs. 46 and 51,) upon which is fulcrumed a rocking lever $o'$, which extends in the direction of the side frame $A^2$ near the front of the machine. The lever $o'$ is pivotally connected between its ends by means of a link $q^5$ with the extensible part $q^4$ of the bell-crank lever $q$. Fulcrumed upon a shaft $n$ in a bearing $n'$ on the side frame $A^2$ is a bell-crank lever $n^2$, having an upward-extending arm $n^3$ and a horizontally-extending arm $n^4$. A link $n^5$ is pivotally connected at one end to the rocking lever $o'$ between the shaft $o$ and link $q^5$ and at its opposite end with the free end of the arm $n^4$ of the bell-crank lever $n^2$. On the rock-shaft D is a second forward-extending arm $m$, which rocks with the shaft.

Fulcrumed upon a rod $m'$, extending across the lower front portion of the machine and constituting one of the tie-rods of the frame, is a lever $m^2$. The lever $m$ is bifurcated at its end in the vertical plane, and the lever $m^2$ is bifurcated at its end in the horizontal plane. Extending between the forks of the lever $m$ is a pin $m^3$, which pin is straddled by the forks of the lever $m^2$.

E is a vertical rock-shaft mounted adjacent to the side frame A' at the lower end in a bearing forming part of the main frame of the machine and at its upper end in a stationary bracket. On the shaft E and firmly secured thereto is a crank $l$, which at its free end is pivotally connected to a link $l'$. At its opposite end the link $l'$ is pivotally connected to one of the side bars of the rocking frame D'. From the foregoing explanation it will be seen that as the rocking frame D' is rocked back and forth the arm $p$ is rocked in the vertical plane. The bell-crank lever $q$, rocking in the vertical plane, rocks the lever $o'$ and through the latter the bell-crank lever $n^2$. The arm $m$ is rocked in the vertical plane and by its engagement with the lever $m^2$ rocks the latter also in the vertical plane, and the link connection between the vertical shaft E and rocking frame D' causes the former to be rocked in the horizontal plane.

As before stated, the machine may be employed for making either long-filler or short-filler bunches. When employed for long-filler bunches, the carriage provided with the initial receptacle for the filler is caused from the rocking arm $p$ to reciprocate between its discharge position in the machine and its receiving position at one side thereof. From the initial receptacle the filler is discharged upon the bunch-rolling mechanism by a plunger actuated from the rocking lever $o'$. The bunch is rolled by movement of the rocking frame D', and when completed it is discharged from the bunch-rolling mechanism into a reciprocating carrier actuated from the rock-shaft E. The reciprocating carrier moves from a vertical position at the bunch-rolling mechanism to a horizontal position, where it registers with the molds in the mold-board. The bunch is discharged from the carrier into the mold-board by an ejector actuated from the bell-crank lever $n^2$. The mold-board after receiving a bunch is raised the distance of one mold by mechanism actuated from the rocking lever $m^2$.

At the right-hand side of the machine is a table F, mounted upon brackets $F'\ F^2$, secured to the side frame $A^2$. The brackets $F'\ F^2$ are held together in rigid relation by tie-rods $F^3\ F^4$. Centrally upon the tie-rod $F^4$ is a supporting-bracket $F^5$. (Shown in detail in Fig. 8.) At its upper end the bracket $F^5$ is provided with shoulders $F^6\ F^6$, affording supports for the ends of parallel rails G. The rails are held firmly to the support $F^5$ by a bolt which passes through the rails and through perforated ears $F^7$ on the support.

Rigidly secured to the tie-rods $A^6\ A^7$ of the main frame of the machine in the position shown is a bracket H, which is shown in detail in Fig. 14. The bracket comprises an arm H', having openings $H^2$ $H^2$, receiving the tie-bars $A^6$ $A^7$, respectively, and a downward-extending head $H^3$. The head $H^3$ is provided with an upper bolt-hole $H^4$ and two lower bolt-holes $H^5$.

$H^6$ is an adjustable block having elongated openings $H^7$ through it, at which the block is secured to the openings $H^5$ of the head $H^3$ by bolts. On the block $H^6$ is a horizontally-projecting ear $H^8$, which affords a bearing for the upper end of the vertical rock-shaft E, before mentioned. Upon the head $H^3$ is a projecting shoulder $H^{13}$, against the under surface of which the block $H^6$ bears at its upper edge.

$H^9$ is an adjustable block or support, which rests upon the upper edge of the block $H^6$. The support $H^9$ is provided with an elongated opening $H^{10}$, at which it is secured by a bolt to the opening $H^4$ of the head $H^3$. The inner ends of the rails G are bolted to opposite sides of the support $H^9$, as shown in Fig. 16.

Upon the support formed with the parallel rails G is a reciprocating carriage I. The carriage I is formed with side bars I' (most clearly shown in Fig. 18) and ends $I^2$ $I^3$, affording journals for flanged wheels $I^4$, which travel upon the rails.

Rigidly secured in the side frame $A^2$ is a vertical bar K, provided about midway of its ends with a cam-slot K'. (See Figs. 9 and 11.)

Pivotally mounted at its lower end centrally upon the tie-rod $F^3$ of the bracket-frame F is a swinging lever $p^2$, which at its upper end is connected by means of a link $p^3$ pivotally to the end $I^3$ of the carriage I. A link $p^4$ (shown in detail in Fig. 10) is bifurcated at opposite ends, at one of which it engages the lever $p^2$ and is pivotally secured thereto above the fulcrum $F^3$. At its opposite bifurcated end the lever $p^4$ embraces the bar K and is provided with a roller $p^5$, which extends through the cam-slot K'. Near its roller the link $p^4$ is pivotally connected to a link $p^6$, which at its opposite end connects pivotally with the arm $p$ on the rock-shaft D. In the rocking of the rock-shaft D the link $p^6$ is drawn down, dragging with it the link $p^4$, and by causing the roller $p^5$ to travel in the cam-slot K' gives to the lever $p^2$ an oscillating motion, which moves the carriage I upon the rails G from one end to the other of the latter.

Mounted in the frame of the carriage I is the initial receptacle L for the filler. The receptacle L also operates as an initial shape for the filler, and for that purpose conforms in cross-section approximately to the shape of the bunch into which the filler is to be formed. At opposite ends the receptacle L is provided with perforated ears L'. (See Fig. 22.)

Secured at its upper end to the end $I^2$ of the carriage, at the center of the latter, is a downward-extending guide-rod $I^5$, and upon the end $I^3$ of the carriage is an upward and downward extending bracket $I^6$, (see Figs. 23 and 25,) having cross-pieces $I^7$ at the top and bottom, provided with vertical guide-openings through them. (See Fig. 22.)

$L^3$ is a frame, which is shown most clearly in Fig. 19. The frame $L^3$ is adapted to receive the receptacle L, the two being secured together by screws passing through the ears L' on the receptacle. In one end portion of the frame $L^3$ is a guide-opening $L^4$, which receives the rod $I^5$, and beyond the said opening the frame is provided with a pointed projection $L^5$. At its opposite end the frame $L^3$ is provided with a vertical opening to receive a rod $L^6$, which is adjustably secured to the frame by a set-screw $L^7$. (See Fig. 22.) The rod $L^6$ extends upward and downward from the frame $L^3$ through the guide-openings in the cross-pieces $I^7$, above the upper one of which it is shaped into a hook $L^8$, as shown. On the opposite sides of the frame $L^3$ are laterally-projecting ears $L^9$. The rails G from their ends adjacent to the bracket $F^5$ to the discharge position of the receptacle are provided with inward-extending flanges G'. When the frame $L^3$ is raised against the under surface of the carriage I, the ears $L^9$ will raise and slide upon the flanges G'; but when the carriage is moved into the machine beyond the ends of the flanges G' the frame $L^3$ is free to be moved downward and carry with it the receptacle L.

M is a rocking yoke-frame pivoted in bearings M' at opposite sides of the upper portion of the main frame of the machine. A rod $M^2$ is pivotally connected at its upper end with the rear portion of the yoke M and at its lower end carries a laterally-extending roller, which projects into the cam-groove $y'$ of the cam-wheel $C^2$. The right-hand arm of the yoke M is provided in its forward end with a slot $M^3$, and pivoted to the end of its left arm is a downward-extending bar $M^4$. The bar $M^4$ is provided at its lower end with an elongated guide-slot $M^5$, which embraces and moves upon a pin or screw $M^6$, which is secured to the bracket H at $H^{11}$. Through the rod $M^4$, above the slot $M^5$, is a hole $M^7$. When the carriage is moved into the machine, the hook end $L^8$ of the rod $L^6$ engages the slot $M^3$ on the right arm of the yoke M and the pointed end $L^5$ of the frame $L^3$ enters the hole $M^7$ in the rod $M^4$. At the moment the hook $L^8$ and end $L^5$ engage the openings $M^3$ and $M^7$, the ears $L^9$ pass the ledges or flanges G' of the rails G, and the yoke-frame M is rocked to move the free ends of its arms downward, and thus force the frame $L^3$ and receptacle L in the same direction. The yoke-frame is then moved upward, carrying with it the frame $L^3$ and receptacle, and the carriage is drawn out of the machine to cause the ears $L^9$ to slide upon the flanges G' of the rails. The rod $M^2$ is held at its lower end against lateral movement, which would disengage its roller from the cam-groove $y'$ by a link M⁸, which at one end is pivotally connected with the rod M², and pivoted at its opposite end to a tie-rod A¹³ of the main frame.

N is a swinging gate or valve, which moves into and out of an opening L¹⁰, extending the full length of one side of the receptacle L, to open and close the lower end of the receptacle. The valve N comprises a plate, which is secured to a swinging frame N', pivoted at the upper part of its ends to the frame L³. One end of the swinging frame N' is enlarged to one side of its pivot, as shown in Fig. 20, to weight the frame at the outer side and cause it normally to maintain the valve across the receptacle. At the top of the left-hand end (shown in Fig. 20) are horizontally-extending forks N². (See Fig. 28.)

In the upper part of the machine are two parallel vertically-extending guide-rods O O for a vertically-reciprocating cross-head O'. Centrally upon the cross-head is a vertically-extending rod O², which reciprocates through a guide A⁸. Pivoted to the front and center of the cross-head O' is a link O³. At its upper end the link O³ is pivotally connected to an adjustable finger O⁴ upon a cross-bar O⁵. The finger O⁴ may be adjusted to any angle on the cross-bar O⁵ and tightened when adjusted by means of a set-screw, as shown in Figs. 1 and 54.

O⁶ is a vertically-reciprocating rod or link pivotally connected at its upper end to one end of the cross-bar O⁵ and at its lower end to the free end of the swinging lever o'.

Projecting downward from the cross-head O' is a plunger or discharger having a removable and replaceable head O⁷. The plunger-head or discharger O⁷ is of a shape in cross-section to fit the receptacle L, and it reciprocates through the receptacle when the latter is in its discharge position in the machine.

Adjustably secured at its upper end at the left-hand side of the cross-head O' is a rod N³, bent at its lower end, as shown in Fig. 28, to afford a cam. In the downward movement of the cross-head the lower end of the cam-rod N³ enters between the forks N² of the swinging valve-frame and by bearing against one of the forks operates to swing the frame and move the valve N out of the receptacle.

P is the rolling-table, which is secured at its rear end to the top of the rocking frame D'. Near its rear edge the forming-table is provided with a vertical opening through it P', of a shape in cross-section approximating the shape of a cigar-bunch, as shown most clearly in Fig. 43. Forward of the opening P' the forming-table describes, approximately, an arc, of which the rock-shaft D is the center. The forward-extending portion of the rolling-table is sustained by a brace-rod P². For purposes of adjustment, should adjustment be necessary, the brace-rod P² at its lower end is screw-threaded and passes through a bearing on the tie-rod s' and held by jam-nuts, as shown most clearly in Fig. 37. For further purposes of the adjustment the connection of the rear portion of the table with the top of the frame D' may be pivotal.

The upper part of the main frame of the machine, in which is mounted the short-filler-feeding mechanism, to be hereinafter described, is narrower than the main frame of the machine and is formed with side frames A⁹ A¹⁰. Fulcrumed between the lower forward ends of the side frames A⁹ A¹⁰ is a frame k, formed of two side bars adapted at their rear end portions to be raised and lowered to a limited extent in slots k' at the rear lower ends of the side frames A⁹ A¹⁰. The frame may be secured in adjusted position by clamp-bolts k². (Shown in Fig. 44.) Journaled between the side bars of the frame k, near the forward ends of the latter, is the bunch-roller k³. The forward end portions of the frame k project beyond the bunch-roller and are formed at their upper edges to produce cam-surfaces k⁴ and just back of the bunch-roller to afford shoulders or stops k⁵. Extending between the side bars of the frame k, just forward of the bunch-roller and just back of the latter, are cross-rods k⁶ k⁷, respectively.

Q is the forming-belt, which is at opposite ends removably secured by clamping-plates P³ to the under sides of the forward and rear edges of the rolling-table. The belt extends from its rear fastening over a cross-bar P⁴ at the rear upper edge of the table, thence around the forming-roller between the latter and the rods k⁷ k⁶, and thence over the serrated portion of the table.

R is the reciprocating carrier-frame of an opening and closing shaper or bunch-mold R², which receives the cigar-bunch from the bunch-rolling table and transfers it to the mold-board. The carrier-frame is formed with end plates h h' and two parallel side bars h² h³. On the vertical rock-shaft E and secured rigidly thereto by a set-screw is a short horizontally-extending shaft E', which extends below the side bar h², through the end plates h h' of the carrier. The carrier-frame is held against longitudinal movement upon the shaft E', but is free to turn thereon. The side plate h² is rigid with the ends of the carrier-frame, while the side plate h³ has laterally-projecting lugs h⁴ h⁴, at which it is hinged to the ends h h'.

Extending between the ends of the carrier-frame are cross-bars h⁵ h⁵ and h⁶ h⁶, the bars h⁵ being separated from the bars h⁶ by narrow spaces, the two spaces forming a guide for a reciprocating ejector R'. Secured upon the cross-bars h⁶ is a finger-spring h⁷, which bears against the hinged side bar h³ to resist movement of that side bar in the direction away from the opposite side bar h². The side bars are each provided with a longitudinal slot to receive the flanged parts i' of shaper-plates i. The shaper-plates are both formed alike, and one is shown in perspective in Fig. 52. Extending from the ends of the carrier-frame to the longitudinal slots are set-screws h⁸, which are adapted to be tightened against the ends of the shaper-plates to hold them securely in position. The shaper-plates together afford a mold or shaper $R^2$ of the form in cross-section of the cigar-bunch. The hinged side bar $h^3$ gives to the shaper-plates the character of opening and closing jaws, the opening being effected against the resistance of the spring $h^7$. Upon the end plate $h'$ in the construction shown in the main figures of the machine are two projecting fingers $h^9$, and upon the end plate $h$ is a rod $h^{10}$, carrying a loose roller $h^{11}$. Secured to the side frame $A'$ of the machine, adjacent to the vertical rock-shaft E, is a finger $g$, which is shown in perspective in Fig. 48. At its free end the finger $g$ describes a quarter-circle around the shaft E, and in the upper edge of the free end portion it is formed with a gradual cam-surface $g'$, terminating in an abrupt cam-surface or stop $g^2$. The rearward end of the carrier-frame R is heavier than the forward end, so that the tendency of the frame is to assume a nearly-vertical position on its pivot—the shaft $E'$. The roller $h^{11}$ in the movement of the carrier travels upon the finger $g$, and owing to the shape of the cam-surface of the finger the roller is raised as the carrier swings in the direction of the mold-board and lowered as the carrier swings in the direction of the rolling-table. The rise of the roller on the cam-surface swings the carrier-frame to the horizontal position, as shown in Fig. 47, and the lowering of the roller $h^{11}$ on the cam-surface permits the frame to be turned by its heavier end portion in the direction of the vertical plane. When the roller reaches the abrupt cam-surface or stop $g^2$, further turning of the shaft $E'$ causes the roller to be engaged by the stop, and thus causes the carrier-frame to be turned to the vertical plane on the shaft $E'$. The carrier reaches the vertical plane the moment that it arrives at the backward limit of its movement, which brings the open end of the jaws of the shaper $R^2$ directly below the end of the rolling-table, as shown in Fig. 42.

Upon the movable jaw or side bar $h^3$ of the shaper is a projecting finger $h^{12}$, and in the path of the free end portion of that finger is a stop $H^{12}$, which is secured to the bracket H. (See Figs. 49 and 50.) As the carrier-frame turns to the vertical position its finger $h^{12}$ engages the stop $H^{12}$ and causes the swinging jaw of the shaper to be opened in the final movement of the carrier-frame to the vertical position. At the instant the shaper reaches the vertical position its upper finger $h^9$ meets a stop $h^{13}$, which is secured to the side frame $A^2$ of the machine. The engagement of the finger $h^9$ with the stop $h^{13}$ aids in steadying the carrier when in its vertical position. The ejector $R'$ is formed with a head portion $f$ (shown in perspective in Fig. 53) and a flat stem $f'$, provided with an opening $f^2$. At the side of the finger $g$ is a cam $g^3$, which projects into the path of the finger $h^{12}$ in the final movement of the carrier in the direction of the mold-board. When the carrier reaches the mold-board, the finger $h^{12}$ engages the cam $g^3$ and aids the spring $h^{11}$ in closing the swinging jaw, besides locking that jaw in its closed condition while the cigar-bunch is being ejected, as hereinafter described.

At the front of the machine and rigidly secured upon the bearing $A^4$, before mentioned, is a bifurcated plate $h^{14}$, the forks of which produce between them a guide for the fingers $h^9$, which enter between them. As the carrier-frame reaches the limit of its movement in the direction of the mold-board the forward finger $h^9$ reaches the base of the forks, and the carrier is thus stopped against further movement in that direction, and is steadied in its horizontal position by the engagement of the fingers $h^9$ with the forks of the plate $h^{14}$.

Formed upon one side of the stem $f'$ of the ejector is a shoulder $f^3$. As the carrier is swung to the vertical plane the ejector drops of its own weight until its shoulder $f^3$ strikes the upper cross-bar $h^6$, which causes the upper face of the head $f$ of the ejector to form the base of the shaper $R^2$, of which the plates $i$ are the sides. The upper face of the head $f$ is made concave to approximate the shape of the cigar-bunch to be formed, and the head is removably attached to the stem to permit its being replaced by a head of another shape when desired.

Secured at one end in the bearing $A^4$, which, as before stated, is part of the main frame of the machine, is a shaft $e$, upon which is mounted a flanged roller $e'$. The roller $e'$ is held by a sleeve $e^2$ at one side and a nut at the other against longitudinal movement, but is free to revolve on the shaft $e$. Pivotally connected at one end to the upper end of the arm $n^3$ of the bell-crank lever $n^2$ is a longitudinally-movable bar $e^3$, which at its free end rests upon the roller $e'$. The bar $e^3$ is formed at the under side of its free end with a cam $e^4$ and on its upper side with a lug $e^5$. As the arm $n^3$ of the bell-crank lever $n^2$ is swung in the direction of the roller $e'$ the bar $e^3$ is moved and is caused by its cam-surface $e^4$ to rise abruptly from the position shown by dotted lines to that shown by full lines in Fig. 51. It rises just as the carrier-frame reaches the end of its traverse at the mold-board and the lug $e^5$ enters and engages the opening $f^2$ in the stem $f'$ of the ejector $R'$. Further movement of the bell-crank lever in the same direction causes the bar $e^3$ to move the ejector and, as hereinafter described, discharge the bunch from the shaper into the mold-board.

S is a mold-board of common construction, provided with molds or final receptacles for the bunch. At the forward left-hand side of the main frame are two stationary vertical guide-bars $d\ d$, having flanges $d'\ d'$, which afford between them a vertical guide-recess. Above the bars $d$ and in line with the guide-recess is a pulley $d^2$. Extending over the pulley is a strap $d^3$, provided at one end with an L-shaped block or hook $d^4$, which moves in the guide-recess between the flanges $d'$, and at its opposite end the strap carries a weight $d^5$. To one side of the guide-bar $d$ is a vertical bar $c$, L-shaped in cross-section Rigid with the bar $c$ are a lower bracket $c'$, Fig. 33, and an upper bracket $c^2$, Fig. 32, each provided along its free end portion with an elongated opening $c^3$, widened at the rear side to afford a socket. Extending through the openings $c^3$ and adjustable longitudinally thereof are bolts $c^4$, the heads of which rest in the sockets to be flush with the rear surfaces of the brackets, the bolts carrying winged nuts $c^5$. On the rear side of each bracket, near the bar $c$, is a bolt $c^6$, carrying a winged nut $c^7$.

In the upper and lower bars of the side frame A' (see Fig. 3) are horizontally-elongated openings $c^8$ $c^9$. The bolts $c^6$ of the bracket $c'$ extend through the openings $c^8$ and its winged nut $c^7$ is on the outer surface of the frame. The bolts $c^6$ of the upper bracket $c^2$ extend through the guide-opening $c^9$ and its winged nut is also on the outer side of the frame. The bar $c$ may thus be adjusted laterally on the side frame A' and secured in adjusted position by tightening the winged nuts $c^7$. Extending parallel with the bar $c$ is a similarly-shaped bar $c^{10}$, having laterally-extending ears $c^{11}$ $c^{11}$. Pivoted at one end to the upper ear $c^{11}$ and at its opposite end upon the lower bolt $c^4$ is a link $c^{12}$, and fulcrumed between its ends upon the upper bolt $c^4$ is a lever $c^{13}$, which at the end of one arm is pivotally connected with the upper ear $c^{11}$ of the bar $c^{10}$. By loosening the winged nuts $c^5$ the bolts $c^4$ may be shifted toward or away from the bar $c$, and thus increase or diminish the normal distance of the bar $c^{10}$ from the bar $c$. Pressure exerted upon the handle portion of the lever $c^{13}$ in the downward direction causes the bar $c^{10}$ to be moved away from the bar $c$, always extending in a plane parallel with the latter, and when the lever is released the bar $c^{10}$ will drop to its normal position. (Shown in Fig. 30.)

In placing the mold-board S in position it is slid down from the top between the bars $c$ $c^{10}$ to engage the hook $d^4$, when further pressure will cause the weights $d^5$ to rise as the mold-board is pressed down to its initial position. When inserting the mold-board into the machine, the lever $c^{13}$ is pressed down to cause the bar $c^{10}$ to recede from the bar $c$. When the mold-board has been forced down to its lowest or initial position, the lever $c^{13}$ is released, causing the mold-board to be clamped gently between the bars $c$ and $c^{10}$. The weight $d^5$ acts as a counter-balance for the mold-board. On the lower bracket $c'$ is a bracket $c^{14}$, affording a bearing for a vertically-extending adjusting-screw $c^{15}$. The screw $c^{15}$ may be raised and lowered in its bearing and operates as a stop, upon which the mold-board rests at its lower end when first inserted in the machine. The screw $c^{15}$ is so adjusted as to cause the topmost mold of the mold-board S to be in the proper plane to receive a bunch from the shaper $R^2$. On the bars $c$ and $c^{10}$ in the position shown are overlapping guides $c^{16}$, which engage the lateral edges of the mold-surface of the mold-board to prevent the latter from falling forward, and the upward-extending portion of the bracket $c^{14}$ is cam-shaped, as shown in Fig. 31, to guide the lower end of the mold-board when inserted against the surface of the bars $c$ $c^{10}$. Extending laterally from the bar $c^{10}$ is a finger $c^{17}$. Pivotally connected with the side frame A' is a bent rod $c^{18}$, which rests normally upon the stop $c^{17}$ and extends across the forward side of the mold-board. On the shaft $o$ is a downward-projecting stirrup $b$. (Shown in section Fig. 51 and in elevation in Figs. 1, 2, and 4.) Pivotally connected at its lower end to the lever $m^2$ and passing upward through the stirrup $b$ is a vertically-moved rod or pawl $b'$. In its vertical reciprocation the pawl oscillates slightly at its upper end upon the fulcrum formed by the stirrup $b$. The pawl $b'$ in its upward reciprocation engages one of the molds of the mold-board and raises the latter the distance of one mold. In the descent of the pawl it swings free of the mold-board, owing to the oscillation described, which is produced by the movement of the lever $m^2$ in a direct vertical plane, while the pawl slants in the direction of the mold-board. When the mold-board is placed in the machine and the lever $c^{13}$ is depressed, as described, the rise of the guide-bar $c^{10}$ causes the finger $c^{17}$ to raise the bent rod $c^{18}$ and cause the latter to engage the pawl $b'$ and swing it out of the way.

The size and shape of the cigar-bunch to be made having been determined upon, an initial receptacle L, of the proper size and shape to receive just the desired quantity of filler and apportion the latter properly for the desired shape, is secured at its ears L' in the frame $L^3$ of the carriage. A plunger-head $O^7$, of suitable shape in cross-section, is secured to the downward-extending arm of the cross-head O'. Shaper-plates $i$ of the desired form are placed in the carrier-frame and suitable mold-boards S provided. As mold-boards vary in width to correspond in length with the cigar-bunches they are to receive, the guides for the mold-boards must be adjusted by moving the guide-bar $c$ upon the frame and the guide-bar $c^{10}$ upon the brackets $c'$ $c^2$ to bring the center of the mold-board in line with the center of the shaper-plates $i$. This adjustment is effected as before described. In this machine, as in others, as the filler is discharged from its initial receptacle to the bunch-forming mechanism a binder is fed thereto to form the inner wrapper of the cigar. At the front side of the main frame is a table $A^{11}$, upon which is a plate $A^{12}$, which extends inward in the direction of the path of the plunger $O^7$. Fulcrumed upon the tie-bar $A^{13}$, forming, as before stated, part of the main frame of the machine, is a lever T, having a short downward and rearward extending arm T', which rests upon the cam-surface $y^2$ of the wheel $C^2$. The long arm of the lever T is provided on its rear side with a weight $T^2$, which operates to maintain the arm $T'$ against the cam-surface $y^2$. At its upper end the lever is pivotally connected to the rear end of a stirrup $T^3$, which at its forward end carries a cross-rod $T^4$, which slides upon the cam-surfaces $k^4$ of the frame $k$ from the free ends of the latter to the stops $k^5$. The rod $T^4$ operates as a binder-tensioner, as hereinafter described.

In the operation of my machine to form long-filler bunches, as the initial receptacle L is reciprocated across the table F an operator fills it with long-filler tobacco. Starting with the carriage at the outward limit of its reciprocation as the initial position of the working features of the machine the operation of the various mechanisms to form the cigar-bunch will be next described. The rotation of the shaft C causes the rocking frame $D'$ to start forward and move the rolling-table to its forward position with its opening $P'$ in line with the plunger $O^7$. (Shown in Figs. 37 and 39.) At the same time the arm $p$ on the rock-shaft D is swung downward to move the carriage to the discharge position, which brings the initial receptacle also in line with the plunger $O^7$. Owing to the shape of the cam $y$ the rocking frame $D'$ remains in the forward position during a period of about one-third of the revolution of the wheel $C^2$ and the carriage remains at rest in the discharge position for the same period of time. In the rotation of the wheel $C^2$, starting with the forward movement of the frame $D'$, the bell-crank lever $q$ is caused to rock in the direction to swing the lever $o'$ in the downward direction to move the rod $O^6$, and consequently the plunger $O^7$, in the same direction. The movement of these parts continues after the rocking frame $D'$ is brought to rest in its forward position. The continued downward movement of the plunger causes it to pass into and through the initial receptacle and into the opening $P'$ at the rear end of the forming-table P. In the descent of the cross-head $O'$ the cam-rod $N^3$ descends and engages as it nears its lowest limit the forks $N^2$ of the valve N and opens the latter. As the carriage nears its position in the machine the pointed end $L^5$ of the frame $L^3$ enters the opening $M^7$ of the vertical bar $M^4$ and the hook $L^8$ enters the slot $M^3$ of the yoke M. The moment that the carriage is brought to rest in this position the rod $M^2$ is moved upward by the cam $y'$ and rocks the yoke M, causing the frame $N^3$ and initial receptacle L to be plunged downward to the position shown in Figs. 25 and 39. The binder-tensioner $T^4$ in the meantime is maintained in its forward position (shown in Figs. 37 to 39) by the pressure of the cam-surface $y^2$ against the arm $T'$ of the bell-crank lever T. At the moment the rolling-table reaches its forward position an operator feeds a binder X across the path of the descending plunger below the lower end of the initial receptacle L. In its descent through the receptacle the plunger forces the filler Y against the forming-belt Q and crowds the latter, the filler, and the edge of the binder into the opening $P'$, the belt Q forming a pocket in that opening, as shown in Fig. 39. When this has taken place, the bell-crank lever $q$ is caused to rock in the opposite direction and move the plunger $O^7$ upward. In the rise of the plunger the cam-rod $N^3$ disengages the valve N and the latter swings downward to close the lower end portion of the receptacle L. At the same time the cam $y'$ causes the rod $M^2$ to descend and rock the yoke M in the direction to raise the frame $L^3$ until its wings $L^9$ are in the plane of the flanges $G'$ of the rails G. After the receptacle L has been raised the cam $y^2$ permits the arm $T'$ of the bell-crank lever T to drop and move the upward-extending arm of the lever and the yoke $T^3$ backward, causing the binder-tensioner to engage the binder and press it against the belt Q at the bunch-roller $k^3$. At the moment that the initial receptacle reaches its elevated position the cam $y$ starts the rocking frame $D'$ in the backward direction, causing the carriage to move out of the machine and the rolling-table to move backward. The various stages in the rolling of the bunch in the backward movement of the rolling-table are shown step by step in Figs. 40, 41, and 42. While the table is moving backward the forming-belt is drawn across the bunch-roller $k^3$ in the backward direction, and the binder, being held against the belt by the tensioner $T^4$, is tensioned between the latter and the backward-traveling belt to stretch it as it is wound around the filler. In the backward motion of the rolling-table the shaft E is rocked in the direction to cause the carrier-frame R of the shaper $R^2$ to move the latter to its vertical position. (Shown in Fig. 42.) In assuming the vertical position, as described, the projection $h^{12}$ strikes the stop $H^{12}$ and the movable jaw of the shaper is opened. The shaper reaches the position described just as the rolling-table reaches its final backward position and the bunch is discharged therefrom to drop into the shaper, as shown in Fig. 42. As the forming-table starts forward again the shaft E is rocked to swing the carrier-frame of the shaper around to its horizontal position at the mold-board. The shaper is moved to the mold-board while the rolling-table is being swung forward to its initial position, and as the shaper approaches the mold-board the bell-crank lever $n^2$ is swung by the lever $o'$ to move the cam-bar $e^3$ across the roller $e'$. Just as the shaper ceases to move the bar $e^3$ is raised by the engagement of its cam $e^4$ with the wheel $e$ and its lug $e^5$ engages the opening $f^2$ of the ejector $R'$. The further movement of the bar $e^3$ causes the ejector to be plunged toward the mold-board and discharge the bunch into the mold with which the shaper registers. The movable jaw of the shaper being firmly locked in its closed condition by the engagement of the projection $h^{12}$ with the cam $g^3$, the crowding effect produced by the ejector against the bunch will prevent opening of the jaw and consequent expansion of the bunch, which would tend to cause the binder to become torn as the bunch is crowded into the final mold. When the carrier has started backward in the direction of the rolling-table, the lever $m$ rocks upward with the rock-shaft D, and by swinging the lever $m^2$ in the upward direction causes the pawl $b'$ to engage the mold-board and raise it the distance of one mold. As before stated, the weight $d^5$ tends to counterbalance the mold-board. The mold-board is free to slide upward in its guide-frame, but is prevented from descending therein by the clamping effect produced by the guide-bar $c^{10}$. The operation of the machine is continuous, a filler to form a bunch being transferred from the initial receptacle to the rolling-table, as the bunch previously formed is discharged into the mold-board, and it is only necessary to stop the machine long enough when a mold-board is filled to insert a new mold-board into the machine. The relative positions of the fibers of long filler are never changed after they are inserted into the initial receptacle, and they are thus prevented from intertwisting, which would tend to injure the "draft" of the cigar. It requires but little skill and practice on the part of the operator who inserts the filler into the initial receptacle to put in the proper amount for each bunch, and as the operation throughout is positive there can be no appreciable variation between the bunches formed. All the moving parts which operate upon the bunch are rendered adjustable, and when once adjusted they perform their functions without change. When a cigar-bunch of greater or less diameter is to be formed, the distance of plunge of the plunger $O^7$ must be changed to a slight degree. This is done by adjusting the extension $q^4$ of the arm $q^3$ of the bell-crank lever $q$. The same adjustment increases or diminishes the distance of reciprocation of the bar $e^3$, which actuates the ejector, so that as the plunger would travel at a slightly-greater distance for a cigar-bunch of less diameter the bar $e^3$ would travel a correspondingly-greater distance and plunge the ejector farther into the mold-board. The forming-belt being secured, as before described, by clamping-plates $P^3$, it may be readily lengthened and shortened when desired. When it is wished to exert greater or less pressure against the bunch in the final operation of the rolling-table, this may be done by raising or lowering the brace-rod $P^2$ in its bearing at $s'$. As shown in Fig. 45, the rolling-table is rendered concave to the contour of one side of the bunch to be formed. When the bunch to be formed is of another shape, the forming-table may be removed from the rocking frame $D'$ and replaced with another by loosening the set-screws $P^5$, (shown in Fig. 43,) upon which the table is pivotally mounted. The machine may thus be readily and quickly arranged to turn out cigar-bunches of any shape desired.

In order that my machine may be employed for making short filler or scrap bunches, as well as long-filler bunches, I provide at the top of the machine in the part $A^9$ $A^{10}$ of the frame a short-filler receptacle V, surmounted by a hopper V'. The receptacle V is rounded at the bottom in the arc of a circle, the center of the base portion being the lowest point. Extending transversely through the receptacle at the center of the arc described by the bottom thereof is a shaft $V^2$. Fulcrumed between its ends on the shaft $V^2$ is a stirrup-frame $V^3$, which at its rear end carries a weight $V^4$, and at its forward ends is pivotally connected to the cross-bar $O^5$. Pivotally connected at their upper ends upon the shaft $V^2$ at the outer sides of the stirrup-frame are downward-extending arms $V^5$ $V^6$, secured at their lower ends to the opposite extremities of an adjustable box $V^7$. Keyed upon the shaft $V^2$ at the outer side of the arm $V^6$ is a sector-gear $V^8$. $V^9$ is a bell-crank lever pivoted at one side of the frame $A^{10}$ below the shaft $V^2$. One end of the bell-crank lever $V^9$ is formed into a sector-gear, which meshes with the sector-gear $V^8$, and the other arm is connected by means of a link $V^{10}$ with the stirrup-frame $V^3$, all as most clearly shown in Fig. 2. Secured to the discharge end portions of the box $V^7$ are backward-projecting arms $V^{11}$. (Shown by dotted lines in Figs. 2 and 3.) The arms $V^{11}$ at their free ends are adapted to be connected to opposite sides of the stirrup-frame $V^3$ at the points $V^{12}$. The machine being shown in the drawings as it appears when making cigar-bunches of long filler, the arms $V^{11}$ are indicated only by dotted lines, because they are not connected at the points $V^{12}$ of the stirrup-frame, except when the machine is used for making short-filler bunches. At the center of the shaft $V^2$ is a rod $V^{13}$, which projects almost to the base of the receptacle V and operates as a stirrer. The base proper of the receptacle V has a transverse opening $a$. The box $V^7$ is provided with winged plates $a'$ $a^2$, describing the arc of the bottom of the receptacle and movable in guides $a^3$, secured to the receptacle-base. The box $V^7$ is open at the base and closed by a hinged valve $a^4$. In the box are adjustable ends $a^5$ $a^5$, which may be moved toward and away from the longitudinal center by means of adjusting-screws $a^6$. (See Fig. 58.) The end pieces $a^5$ are constructed, as shown in Fig. 60, with a top plate $a^7$. The size of the receptacle which the box affords may be enlarged or diminished by adjusting the end pieces $a^5$ away from or toward each other. Below the receptacle V is an inclined plate $w$, which terminates at its upper end just below the forward end of the opening $a$ and at its lower end adjacent to the path of the plunger $O^7$. Extending downward and backward of the inclined plate $w$ is an inclined plate $w'$. On the inclined plate $w$ are guide-plates $w^2$, which converge toward the lower end of the plate, as shown in Fig. 57. Extending backward from the top of the plate $w$ is a curved strip $w^3$, upon which the box slides in its movement.

When the machine is to be used for making short-filler cigars, the carriage-operating bar $p^6$ is disengaged from the rocking arm $p$ by the removal of the connecting-bolt shown, and the carriage is moved into the machine to remain there permanently. The arms $V^{11}$ described are connected by means of pins or bolts to the stirrup-frame $V^3$ at $V^{12}$, as described. The movable ends $a^5$ of the box are then adjusted to afford a receptacle of proper size to receive the exact quantity of filler desired for a cigar-bunch. In the downward movement of the rod $O^6$, which operates the plunger $O^7$, as before described, the stirrup-frame $V^3$ is swung down on its fulcrum, and owing to its link connection $V^{10}$ with the bell-crank lever $V^9$, swings the long arm of the latter upward and rotates the sector $V^8$, and consequently the shaft $V^2$, in the direction which causes the stirrer $V^{13}$ to swing in the forward direction. At the same time the box-frame $V^7$, owing to its connection $V^{11}$ with the stirrup-frame $V^3$, is swung in the backward direction to the position shown in Fig. 54. In passing below the opening $a$ of the receptacle V the space between the end pieces $a^5$, which is open at the top, is filled with short filler, the valve $a^4$, which forms the bottom of the receptacle, being closed and maintained closed by the strip $w^3$. In the upward movement of the rod $O^6$ and plunger the parts described are moved in the reverse direction to the position shown in Fig. 55. In sliding to the position shown the upper part of the box-frame is closed by the base of the receptacle V at the forward side of its opening $a$, and on passing the upper end of the plate $w$ the valve $a^4$ drops upon the plate and opens the base of the receptacle, permitting the short filler to drop upon the chute formed by the inclined plate. In passing down the chute the short filler is directed to the receptacle L by the guide-plates $w^2$. In the forward and backward movement of the box-frame its wings $a'$ $a^2$ operate as a false bottom for the receptacle V to prevent the escape of filler from it, except into the receptacle formed by the box, and in the backward movement of the box the valve $a^4$ is closed by the strip $w^3$.

In the manufacture of short-filler bunches I prefer to provide a receptacle L, having its outer side made higher and more flaring than the receptacle employed only for long filler, as shown in Figs. 26, 27, 54, and 55, to more readily catch all the short filler which descends from the chute. The inclined platform $w'$ operates to prevent any of the scrap or dust which might fall upon it from dropping into the machine, and a suitable pan (not shown) may be placed at the lower end of the plate $w'$ to catch any particles which may roll down the latter. It will be noticed that the stirrer $V^{13}$ always moves in the reverse direction to the box-frame $V^7$, and by its stirring effect upon the tobacco prevents the latter from caking and insures the receptacles being filled in each operation. When a charge of short filler has dropped into the mold L, the subsequent operations of the machine are the same as those described for long filler, except that the carriage remains stationary in the machine.

If desired, the machine may be employed for combination bunches of both short and long filler, in which case the carriage would be caused to reciprocate into and out of the machine and the short-filler-charging mechanism to operate as described.

In the machine of the Steinle patent, No. 479,472, dated July 26, 1892, above referred to, the filler when discharged from the initial receptacle drops upon the forming-belt. In dropping it is apt to scatter slightly—in other words, produce a disarrangement of the fibers—which when the bunch is rolled may cause an intertwisting of the fibers to the detriment of the draft of the bunch. In the present machine the initial receptacle moves downward, as described, to the forming-belt, and the filler is thus prevented from scattering or curling to any extent.

It is found in practice that to prevent the fibers from changing their relative positions to any material extent after their insertion into the initial receptacle a positive pressure should be maintained against all sides of the filler. This is done in my machine, and the filler is given no chance to expand between the time that it is engaged by the plunger or discharger $O^7$ until after it has been rolled into the binder. The instant that the discharger and initial receptacle commence to rise out of the pocket formed by the rolling-belt the rolling-table moves in the backward direction and the pocket is closed. Moreover, the opening $P'$ of the rolling-table, in which the pocket is formed, is, as before stated, of approximately the shape of the bunch to be formed, and the initial rolling is effected in the opening $P'$, as shown in Fig. 40. These features combine to insure the manufacture of uniform bunches and the production of perfect draft.

In the construction shown in Figs. 61 and 62 the finger $g$, instead of being formed with the cams $g'$ $g^2$, carries a stationary mitered segmental rack or sector-gear $g^4$, provided at the center of the arc it describes with a hub, which loosely surrounds the rock-shaft E and rests upon a collar $E^2$, carried by that shaft. The rod $h^{10}$ and roller $h^{11}$ are dispensed with, and in their stead a mitered sector-gear $E^3$, meshing with the sector-gear $g^4$, is mounted at its hub upon the shaft E to turn with the carrier-frame R. One laterally-projecting finger $h^9$ is provided upon the plate $h'$ at the rear end of the latter. The plate $h^{14}$, secured upon the bearing $A^4$, instead of being bifurcated, is formed with an upper cam-surface $h^{15}$, (see Fig. 63,) terminating in a socket $h^{16}$. At the end adjacent to the socket $h^{16}$ the plate is provided with a laterally-projecting stop $h^{17}$ and at its opposite end it is formed with a socket $h^{18}$. The shaft E' is extended to project a limited distance beyond the plate $h'$. As the shaft E is rocked in the backward direction, swinging the shaft E', the engagement of the gear $E^3$ with the stationary gear or rack $g^4$ causes the carrier-frame to be turned to the vertical plane at the rolling-table. Movement of the shafts E E' in the opposite direction causes the carrier-frame to be turned to the horizontal plane at the mold-board. In the final movement of the carrier-frame to the mold-board the free end portion of the shaft E' moves upon the surface $h^{15}$ to the socket $h^{16}$, the finger $h^9$ enters the socket $h^{18}$, and the pivotal jaw of the shaper rests at one end upon the stop $h^{17}$. The socket $h^{18}$ pitches upward, as shown, causing the finger $h^9$ as it engages the socket to tend to elevate the rear end of the carrier-frame and depress the forward end thereof to press the movable jaw against the stop $h^{17}$ and lock it firmly against opening under the pressure exerted against it while the bunch is being ejected. Thus the carrier-frame is turned back and forth between its vertical and horizontal positions by the miter-gears, is moved steadily, and is held firmly against any tendency to vacillate.

I wish it understood that whatever is shown and claimed in the aforesaid patent of William M. Steinle, No. 479,472, of July 26, 1892, I do not desire to claim in this specification. It will be noticed that owing to the way the valve N is mounted it moves bodily across the lower end of the receptacle L and moves out of contact with the filler. I prefer the valve constructed as shown to the hinged valves hitherto provided in this connection, for the reason that it does not interfere with the movement of the receptacle to the bunch-rolling table and offers no obstruction to the passage of the filler when opened. The bunch-rolling table P is rendered concave, as stated, and shown in Fig. 54, to approximate the shape of the bunch to be formed, so that in the final rolling of the bunch no surface is brought against it which would tend to change its shape. The serrations shown in the upper face of the table operate to prevent slipping of the forming-belt in the backward movement of the table.

What I claim as new, and desire to secure by Letters Patent, is—

1. In a cigar-bunch machine, the combination, with bunch-rolling mechanism, of an initial receptacle for the filler, reciprocating between its long-filler-receiving position and its discharge position in the machine, engaging and releasing means for engaging the receptacle when it reaches the discharge position and reciprocating the same in the direction of the rolling mechanism, and means for discharging the filler therefrom to the bunch-rolling mechanism, substantially as described.

2. In a cigar-bunch machine, the combination, with bunch-rolling mechanism, of a carriage, an initial receptacle for the filler, mounted in the carriage to have limited independent movement therein and reciprocated by the carriage between its receiving and discharge positions, and means for reciprocating the receptacle in the carriage when in the discharge position toward and from the bunch-rolling mechanism, substantially as described.

3. In a cigar-bunch machine, the combination, with bunch-rolling mechanism, of a carriage formed with a relatively-movable section, a receptacle for filler, mounted in said movable section, means for reciprocating the carriage into and out of the machine, and reciprocating means for engaging said movable section when the carriage enters the machine and moving it toward the bunch-forming mechanism, substantially as described.

4. In a cigar-bunch machine, the combination, with bunch-rolling mechanism, of a carriage formed of relatively-stationary and extensible sections, an initial receptacle for filler, mounted in said extensible section, a support extending into the machine and laterally thereof upon which said relatively-stationary section of the carriage reciprocates, a support upon which the extensible section of the carriage reciprocates, terminating at one side of the machine, and reciprocating means engaging the said extensible section as it leaves its support and moving it toward the bunch-forming mechanism, substantially as described.

5. In a cigar-bunch machine, the combination, with the movable bunch-rolling table, forming-belt, and bunch-roller, of a frame in which the bunch-roller is journaled, provided with cam-shaped ends affording guides which project beyond the roller, and a reciprocating frame carrying a binder-tensioning rod which moves upon the said guides in the movement of its frame, and initial movement of the rolling-table to engage and press the binder against the forming-belt, substantially as described.

6. In a cigar-bunch machine, the combination, with the bunch-rolling mechanism and final receptacle for the bunch, of a movable carrier operated from the driving-power of the machine to transfer the bunch from the bunch-rolling mechanism to the final receptacle and comprising a frame provided with a stationary and a pivotal jaw, the jaws affording between them a receptacle for the bunch, a spring upon the frame maintaining the jaws normally closed, a projection upon the pivotal jaw, a stationary stop in the path of said projection near the bunch-rolling mechanism, and a stop for the pivotal jaw near the final receptacle, whereby the pivotal jaw is opened by contact of its projection with one stop in the movement of the carrier to the bunch-rolling mechanism and locked in its closed condition when the carrier is moved to the final receptacle, and ejecting mechanism for discharging the bunch from the carrier into the final receptacle, substantially as described.

7. In a cigar-bunch machine, the combination, with the bunch-rolling mechanism and final receptacle for the bunch, of a carrier operated from the driving-power of the machine to transfer the bunch from the rolling mechanism to the final receptacle, comprising a frame provided with opening and closing jaws, affording between them a shaper for the bunch, an ejector from the carrier-frame, having a stem and reciprocal through the said shaper, and means for actuating the said ejector to discharge the bunch from the shaper to the final receptacle, comprising a longitudinally-movable and vertically-oscillating bar operated from the driving-power of the machine and having a projection engaging and releasing the ejector-stem, substantially as described.

8. In a cigar-bunch machine, the combination, with the bunch-forming mechanism, of a vertically-disposed mold-board, a frame in which the mold-board is yieldingly supported at its lateral edges to move freely in an upward direction and be resisted in its movement in a downward direction, an adjustable stop $c^{15}$ at the base of said frame for the mold-board to rest upon when first inserted in the frame, intermittent raising mechanism for the mold-board, and means for transferring the bunch from the rolling mechanism to the mold-board, substantially as described.

9. In a cigar-bunch machine, the combination, with the bunch-forming mechanism, of a vertically-disposed mold-board, a frame in which the mold-board is yieldingly supported at its lateral edges to move freely in an upward direction and be resisted in its movement in a downward direction, guide projections $c^{16}$ on the said frame, overlapping the face of the mold-board, intermittent raising mechanism for the mold-board, and means for transferring the bunch from the bunch-rolling mechanism to the mold-board, substantially as described.

10. In a cigar-bunch machine, the combination, with the bunch-forming mechanism, of a vertically-disposed mold-board, a frame in which the mold-board is yieldingly supported at its lateral edges to move freely in an upward direction and be resisted in its movement in a downward direction, a counter-balance, an intermittent raising mechanism for the mold-board, and means for transferring the bunch from the bunch-rolling mechanism to the mold-board, substantially as described.

11. In a cigar-bunch machine, the combination, with the bunch-rolling mechanism, initial receptacle for the filler, and mechanism for transferring the filler from the said receptacle to the bunch-rolling mechanism, of a reservoir for short filler, having a discharge-opening in its base, intermittingly-actuated mechanism for transferring short filler therefrom to the initial receptacle, comprising a box provided with wings which slide upon the base of said reservoir, open at its top and having a hinged base-plate, and a stationary strip across which the box moves, operating to engage and close the hinged base as the box moves to its filling position and to disengage the said base as the box arrives at its discharge position, substantially as and for the purpose set forth.

12. In a cigar-bunch machine, the combination, with the bunch-rolling mechanism and final receptacle for the bunch, of a carrier for transferring the bunch from the rolling mechanism to the final receptacle, pivotally mounted upon a rocking support, and means for turning the carrier on its pivot in the movement between its receiving and discharge positions, comprising a stationary rack and a gear connected with the carrier and traveling upon the rack, substantially as described.

NICOLAS STROTZ.

In presence of—
M. J. FROST,
W. N. WILLIAMS.